(12) United States Patent
Frick et al.

(10) Patent No.: US 9,212,251 B2
(45) Date of Patent: Dec. 15, 2015

(54) AMINO GROUP TERMINATED IMPACT STRENGTH MODIFIER AND USE THEREOF IN EPOXY RESIN COMPOSITIONS

(75) Inventors: Karsten Frick, Remetschwil (CH); Jürgen Finter, Zürich (CH); Andreas Kramer, Zürich (CH); Ulrich Gerber, Uitikon-Waldegg (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 13/603,005

(22) Filed: Sep. 4, 2012

(65) Prior Publication Data
US 2013/0037213 A1 Feb. 14, 2013

Related U.S. Application Data

(63) Continuation of application No. PCT/EP2011/052971, filed on Mar. 1, 2011.

(30) Foreign Application Priority Data

Mar. 2, 2010 (EP) .................... 10155136

(51) Int. Cl.
| | | |
|---|---|---|
| C08G 18/50 | (2006.01) | |
| C08G 18/10 | (2006.01) | |
| C08G 18/48 | (2006.01) | |
| C08G 18/67 | (2006.01) | |
| C08G 18/75 | (2006.01) | |
| C08L 63/00 | (2006.01) | |

(52) U.S. Cl.
CPC ............ *C08G 18/5024* (2013.01); *C08G 18/10* (2013.01); *C08G 18/4854* (2013.01); *C08G 18/672* (2013.01); *C08G 18/755* (2013.01); *C08L 63/00* (2013.01)

(58) Field of Classification Search
CPC .... C08G 18/10; C08G 18/672; C08G 18/755; C08G 18/4854; C08G 18/5024; C08L 63/00
USPC .................. 525/410, 415, 450, 437; 528/492
See application file for complete search history.

(56) References Cited

U.S. PATENT DOCUMENTS

| | | |
|---|---|---|
| 5,187,253 A | 2/1993 | Wolf |
| 5,219,975 A | 6/1993 | Schmalstieg et al. |
| 6,433,073 B1 | 8/2002 | Kantner et al. |
| 2003/0032503 A1 | 2/2003 | Yokota |
| 2006/0276601 A1 | 12/2006 | Lutz et al. |
| 2007/0265373 A1 | 11/2007 | Bates et al. |
| 2008/0188626 A1 | 8/2008 | Verghese et al. |
| 2008/0213489 A1 | 9/2008 | Verghese et al. |
| 2008/0260955 A1 | 10/2008 | Hoyles et al. |
| 2008/0287595 A1 | 11/2008 | Verghese et al. |
| 2008/0319105 A1 | 12/2008 | Lutz et al. |
| 2009/0048370 A1 | 2/2009 | Lutz et al. |
| 2009/0082486 A1 | 3/2009 | Bates et al. |
| 2009/0123759 A1 | 5/2009 | Pham et al. |
| 2010/0108260 A1 | 5/2010 | Rasche et al. |

FOREIGN PATENT DOCUMENTS

| | | |
|---|---|---|
| CN | 101657481 A | 2/2010 |
| EP | 0457089 A2 | 11/1991 |
| EP | 1958795 A1 | 8/2008 |
| JP | 2002-263219 A | 9/2002 |
| WO | WO 2005/097893 A1 | 10/2005 |
| WO | WO 2006/052725 A1 | 5/2006 |
| WO | WO 2006/052726 A1 | 5/2006 |
| WO | WO 2006/052727 A1 | 5/2006 |
| WO | WO 2006/052728 A1 | 5/2006 |
| WO | WO 2006/052729 A1 | 5/2006 |
| WO | WO 2006/052730 A1 | 5/2006 |
| WO | WO 2006/128722 A1 | 12/2006 |
| WO | WO 2008/157571 A2 | 12/2008 |
| WO | WO 2009/025991 A1 | 2/2009 |

OTHER PUBLICATIONS

Oprea, S.; Journal of Applied Polymer Science, 2007, vol. 105, p. 2509-2515.*
Marc A. Hillmyer et al., Synthesis and Characterization of Model Polyalkane-Poly(ethylene oxide) Block Copolymers, Macromolecules 1996, 29, pp. 6994-7002.
Robert B. Grubbs et al., Reactive Block Copolymers for Modification of Termosetting Epoxy, Macromolecules 2000, 33, pp. 9522-9534.
Theresa J. Hermal-Davidock et al., Control of the Block Copolymer Morphology in Templated Epoxy Thermosets, Journal of Polymer Science, Part B, Polymer Physics, vol. 45, pp. 3338-3348, 2007.
International Search Report (PCT/ISA/210) issued on May 25, 2011, by the European Patent Office as the International Searching Authority for International Application No. PCT/EP2011/052971.
Written Opinion (PCT/ISA/237) issued on May 25, 2011, by the European Patent Office as the International Searching Authority for International Application No. PCT/EP2011/052971.
Notification of Transmittal of Translation of the International Preliminary Report on Patentability (Forms PCT/IB/338 and PCT/IB/373) and the Written Opinion of the International Searching Authority (Form PCT/ISA/237) dated Oct. 4, 2012, issued in corresponding International Application No. PCT/EP2011/052971. (6 pages).
Oprea, S., "Synthesis and Characterization of Polyurethane Urea Acrylates: Effects of the Hard Segments Structure", Journal of Applied Polymer Science, 2007, vol. 105, pp. 2509-2515.
Huntsman Technical Bulletin, "JEFFAMINE D-400 Polyetheramine", 2007, 2008, 2011, http://www.huntsman.com/performance_products/Media%20Library/global/files/jeffamine_d_400_us.pdf.

(Continued)

*Primary Examiner* — Robert Jones, Jr.
(74) *Attorney, Agent, or Firm* — Buchanan Ingersoll & Rooney

(57) ABSTRACT

The present disclosure relates to impact strength modifiers, the derivative products thereof, and the use thereof in producing two-component epoxy resin compositions. The disclosure in particular relates to amino group terminated impact strength modifiers prepared by reacting a polyurethane prepolymer having isocyanate groups, a primary diamine, and optionally at least one Michael acceptor. The two-component epoxy resin compositions thus formulated are characterized by a great increase in impact strength while retaining an acceptable tensile shear strength. The impact strength modifiers according to the disclosure and the epoxy resin compositions comprising same are in particular suitable for vehicle manufacturing.

24 Claims, No Drawings

(56) References Cited

OTHER PUBLICATIONS

Huntsman Technical Bulletin, "JEFFAMINE D-230 Polyetheramine", 2007, 2008, http://www.huntsman.com/performance_products/Media%20Library/a_MC348531CFA3EA9A2E040EBCD2B6B7B06/Products_MC348531D0B9FA9A2E040EBCD2B6B7B06/Amines_MC348531D0BECA9A2E040EBCD2B6B7B06/Polyetheramines%20%20%20JE_MC348531D0E07A9A2E040EBCD2B6B7B06/Diamine%20products_MC348531D0EA1A9A2E040EBCD2B6B7B06/files/jeffamine_d_230_polyoxypropylenediamine_7_11.pdf.

Second Office Action issued on Sep. 23, 2014, by the State Intellectual Property Office of the People's Republic of China in corresponding Chinese Patent Application No. 201180019242.X, and an English Translation of the Office Action. (17 pages).

Office Action issued on Oct. 14, 2014, by the Japanese Patent Office in Japanese Patent Application No. 2012-555390, and an English translation of the Office Action (7 pages).

* cited by examiner

AMINO GROUP TERMINATED IMPACT STRENGTH MODIFIER AND USE THEREOF IN EPOXY RESIN COMPOSITIONS

RELATED APPLICATION(S)

This application claims priority as a continuation application under 35 U.S.C. §120 to PCT/EP2011/052971, which was filed as an International Application on Mar. 1, 2011 designating the U.S., and which claims priority to European Application No. 10155136.4 filed in Europe on Mar. 2, 2010. The entire contents of these applications are hereby incorporated by reference in their entireties.

FIELD

The present disclosure relates to the field of impact strength modifiers, the derivative products thereof, and the use thereof in producing two-component epoxy resin compositions.

BACKGROUND INFORMATION

Impact strength modifiers have been used for a long time to improve the strength of adhesives against impact forces. In particular, generally epoxy resin compositions indeed have high mechanical strength but are very brittle, i.e., the cured epoxy resin fractures under impact forces such as occur, for example, in vehicle collisions, which results in the destruction of the bond.

For instance, two-component epoxy resin compositions cured at temperatures below 100° C. tend to embrittle and hence to exhibit a poor fracture behavior. Already a moderately strong impact loading causes the adhesive bond to fail.

It was suggested long ago to improve the impact strength of two-component epoxy resin compositions by using impact strength modifiers.

WO2006/128722 A1 pertains to impact strength modifiers for thermosetting epoxy adhesives. Described is a prepolymer based on a polyurethane having isocyanate terminal groups, said terminal groups being reacted with a protecting group compound that can, inter alia, also be amino compounds. Said compounds are described to be monofunctional and are no longer available as free functional groups after having reacted with the prepolymer.

U.S. Pat. No. 5,187,253 describes the reaction of an isocyanate prepolymer with a polyamine. However, the maximum molecular weight of the employed primary diamine is less than 600 g/mol. Further, U.S. Pat. No. 5,187,253 discloses the use of the prepolymer in two-component adhesive compositions.

EP 0 457 089 A2 describes the reaction of a polyetherpolyol with a diisocyanate and an at least difunctional amine that contains either at least two primary or secondary amino groups. The molecular weight range of the difunctional amine is stated as from 60 to 500 g/mol.

However, the polymers described here improve the impact strength of two-component room temperature curing epoxy resin compositions only to a relatively low degree. Still, they usually result in embrittlement of the produced bond after curing.

In particular, it has been found that the impact strength on electrogalvanized steel, an essential substrate in vehicle manufacturing, is often insufficient.

SUMMARY

Accordingly, it is the object of the present disclosure to provide novel amino group terminated impact strength modifiers by which an embrittlement of the bond after curing can be avoided, i.e., which provide an effective flexibility of the bond and still enable a high tensile shear strength.

Surprisingly, it has been found that amino group terminated compounds according to the present disclosure are impact strength modifiers which overcome the drawbacks of the state of the art.

Hence, the impact strength modifiers according to the disclosure and the epoxy resin composition containing the same are in particular suitable for vehicle manufacturing where adhesive joints are required to maintain their integrity even under high mechanical loads, e.g., in the event of an accident.

These amino group terminated compounds allow to prepare further derivatives that result in an increase of the toughness, in particular, the impact strength of the cured compositions formulated therewith. These properties are especially important for restoring bonded vehicle parts without loss of performance after an accident, in order to solve corrosion problems, or during a repair.

Other aspects of the present disclosure are described below in detail.

DETAILED DESCRIPTION

The present disclosure pertains to the use of special amino group terminated polyurethanes as impact strength modifiers, special amino group terminated impact strength modifiers, the derivative products thereof, and the use thereof.

In a first aspect, the present disclosure pertains to the use of an amino group terminated polyurethane prepared by reacting a polyurethane prepolymer having isocyanate groups, a primary diamine, and optionally at least one Michael acceptor, wherein the polyurethane prepolymer having isocyanate groups is prepared from at least one polyisocyanate and at least one polyester or polyether polyol having at least two hydroxyl groups, provided that if the primary diamine has a molecular weight of less than 600 g/mol, it is compulsory that a Michael acceptor is involved in the preparation of the amino group terminated impact strength modifier as impact strength modifier.

In this disclosure, the prefix "poly" in "polyisocyanate," "polyol," or "polyphenol," for example, indicates molecules that formally contain two or more of the respective functional groups.

The term "primary diamine" used in the present disclosure means a diamine having two terminal primary amino groups that does not contain additional secondary amino groups. An incorporation of secondary amino groups in the molecule has proven to be disadvantageous with regard to the branching possibilities of the amino group terminated impact strength modifier according to the disclosure in the consecutive reaction.

"Impact strength modifier" in the present disclosure means an additive to an epoxy resin matrix that, even for small additions, in particular additions of 0.1-35% by weight, preferably 0.5-15% by weight, causes a definite increase in toughness of the cured matrix, and thus higher bending, tensile, shock, or impact stresses can be withstood before the matrix cracks or fractures. Typically, the impact peel strength according to ISO 11343 is used as a measure of the impact strength. Here, the fracture energy (BE) is indicated as the area under the measurement curve (from 25% to 90%, according to ISO 11343). Typically, the impact peel strength according to ISO 11343 can be used as another measure of the impact strength.

The term "polymer" as used in the present disclosure, on the one hand, refers to a collective of chemically uniform macromolecules prepared by a polyreaction (polymerization, polyaddition, polycondensation) where, however, the macromolecules differ with respect to their degree of polymerization, molecular weight and chain length. On the other hand, the term also comprises derivatives of said collective of macromolecules resulting from polyreactions, that is, compounds which were obtained by reactions such as, e.g., additions or substitutions, of functional groups in predetermined macromolecules and which may be chemically uniform or chemically non-uniform. Moreover, the term also comprises so-called prepolymers, that is, reactive organic pre-adducts, the functional groups of which participate in the formation of macromolecules.

In the present disclosure, the use of the term "independently of one another" in connection with substituents, moieties or groups should be interpreted such that substituents, moieties or groups with the same designation may be present simultaneously in the same molecule with different definitions.

In particular, the diamine is selected from the group consisting of aliphatic diamines containing ether groups, in particular polyoxyalkylenediamines; in particular polyoxyethylenediamines, polyoxypropylenediamines; polyoxybutylenediamines, amino group terminated polybutadienes and butadiene/acrylonitrile copolymers or a mixture thereof.

In particular, these are polyoxyalkylene polyamines having two amino groups such as are commercially available, for example, under the name JEFFAMINE® (from Huntsman Chemicals), under the name Polyetheramin (from BASF) or under the name PC Amine® (from Nitroil) and mixtures of the above-mentioned polyamines.

Preferred diamines are polyoxyalkylene polyamines having two amino groups, especially those of the formula (VIIIa).

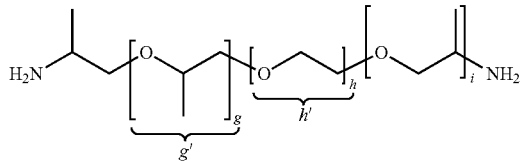

(VIIIa)

Here, g' represents the structural element derived from propylene oxide and h' represents the structural element derived from ethylene oxide. Moreover, g, h, and i each represent values from 0 to 40 provided that the sum of g, h, and i≥1. In particular, molecular weights between 100 and 4,000 g/mol are preferred. According to an embodiment, it is compulsory that a Michael acceptor is involved in the preparation of the amino group terminated impact strength modifier if the molecular weight of the primary diamines used according to the disclosure is below this preferred range. This ensures that the resulting reaction product will fall in the desired molecular weight range from 100 to 4,000 g/mol. It should be noted that the outstanding properties of the impact strength modifier according to the disclosure are at least partially the result of the finding that the molecular weight range of the primary amine used for the preparation or the secondary amine prepared by the reaction with a Michael acceptor ranges above 600 g/mol, preferably between 600 and 4,000 g/mol.

Particularly preferred diamines are JEFFAMINE® offered by Huntsman Chemicals under the D line and the ED line, such as, for example, JEFFAMINE® D-230, JEFFAMINE® D-400, JEFFAMINE® D-2000, JEFFAMINE® D-4000, JEFFAMINE® ED-600, JEFFAMINE® ED-900, or JEFFAMINE® ED-2003.

According to the disclosure, the impact strength modifier or the amino group terminated polyurethane can be prepared by several reaction routes, which means that the amino group terminated polyurethane and/or the primary diamine and/or the polyurethane prepolymer having isocyanate groups reacted with the diamine are reacted with the Michael acceptor.

Thus, as already mentioned above, in one embodiment the amino group terminated impact strength modifier or the amino group terminated polyurethane is terminated with secondary amino groups and results from the reaction of an amino group terminated impact strength modifier or polyurethane having primary amino groups and a Michael acceptor.

When preparing the amino group terminated impact strength modifier according to the present disclosure, the primary amine is used in relation to the polyurethane prepolymer having isocyanate groups such that the ratio of NCO groups to $NH_2$ groups is less than 0.5, in particular less than 0.4, preferably less than 0.25. Higher values would result in the formation of high-molecular oligomers or even in crosslinking. However, such an oligomerization or crosslinking would be extremely detrimental to the gist of the present disclosure. Since the amino group terminated impact strength modifiers are in particular used as adhesive components, they have to be incorporated in the adhesives in the preparation thereof. Therefore, the amino group terminated impact strength modifiers according to the present disclosure are preferably liquid or at least flowable products.

In one embodiment the impact strength modifier according to the present disclosure is characterized in that in addition to the at least one polyether or polyester polyol at least one polymer $Q_{PM}$ having terminal amino, thiol or hydroxyl groups and/or at least one optionally substituted polyphenol $Q_{PP}$ can be used for preparing the polyurethane prepolymer.

Suitable polymers $Q_{PM}$ having terminal amino, thiol or hydroxyl groups are in particular polymers $Q_{PM}$ having two or three terminal amino, thiol or hydroxyl groups.

Preferably, the polymers $Q_{PM}$ have equivalent weights of 300-6,000, in particular 600-4,000, preferably 700-2,200 g/equivalent of NCO-reactive groups.

Suitable polymers $Q_{PM}$ are polyols, e.g., the following commercial polyols or any mixture thereof:

Polyoxyalkylene polyols, also called polyether polyols or oligoetherols, which are polymerization products of ethylene oxide, 1,2-propylene oxide, 1,2- or 2,3-butylene oxide, oxetane, tetrahydrofuran or mixtures thereof, optionally polymerized using a starter molecule with two or more active hydrogen atoms such as, for example, water, ammonia or compounds with several OH or NH groups, such as, for example, 1,2-ethanediol, 1,2- and 1,3-propanediol, neopentylglycol, diethylene glycol, triethylene glycol, the isomeric dipropylene glycols and tripropylene glycols, the isomeric butanediols, pentanediols, hexanediols, heptanediols, octanediols, nonanediols, decanediols, ecanediols, 1,3- and 1,4-cyclohexanedimethanol, bisphenol A, hydrogenated bisphenol A, 1,1,1-trimethylolethane, 1,1,1-trimethylolpropane, glycerol, aniline, as well as mixtures of the above-mentioned compos. Both polyoxyalkylene polyols with a low degree of unsaturation (measured according to ASTM D-2849-69 and indicated in milliequivalents of unsaturation per gram of polyol (mEq/g)) and being produced, for example, using so-called double-metal cyanide complex catalysts (DMC catalysts) as well as polyoxyalkylene polyols having a higher degree of unsaturation and being produced, for example, using anionic catalysts, such as NaOH, KOH, CsOH or alkali alcoholates, can be used.

Especially preferred are polyoxyalkylene diols or polyoxyalkylene triols, in particular polyoxypropylene diols or polyoxypropylene triols.

Polyoxyalkylene diols and triols with a degree of unsaturation that is less than 0.02 mEq/g and with a molecular weight in the range of 1,000-30,000 g/mol, as well as polyoxypropylene diols and triols with a molecular weight of 400-8,000 g/mol are especially suitable.

So-called ethylene oxide-terminated ("EO-endcapped," ethylene oxide-endcapped) polyoxypropylene polyols are suitable as well. The latter are special polyoxypropylene polyoxyethylene polyols which can be obtained, for example, in that pure polyoxypropylene polyols, in particular polyoxypropylene diols and triols, after the polypropoxylation reaction with ethylene oxide is concluded, are further alkoxylated and as a result have primary hydroxyl groups.

Moreover, exemplary compounds are:
hydroxy terminated polybutadiene polyols, such as, for example, those prepared by polymerizing 1,3-butadiene and allyl alcohol or by oxidizing polybutadiene, and also their hydrogenation products;
polyether polyols grafted with styrene-acrylonitrile or acrylonitrile-methylmethacrylate, in particular those supplied, e.g., by Elastogran under the name LUPRANOL®;
polyester polyols, also called oligoesterols, which are prepared from di- to trihydric alcohols such as, for example, 1,2-ethanediol, diethylene glycol, 1,2-propanediol, dipropylene glycol, 1,4-butanediol, 1,5-pentanediol, 1,6-hexanediol, neopentyl glycol, glycerol, 1,1,1-trimethylolpropane or mixtures of the aforementioned alcohols with organic dicarboxylic acids or their anhydrides or esters such as, for example, succinic acid, glutaric acid, adipic acid, suberic acid, sebacic acid, dodecanedicarboxylic acid, maleic acid, fumaric acid, phthalic acid, isophthalic acid, terephthalic acid, and hexahydrophthalic acid, or mixtures of the aforementioned acids, and polyester polyols from lactones such as ε-caprolactone, for example.
polycarbonate polyols available by reacting, for example, the above-mentioned alcohols used for the formation of polyester polyols with dialkyl carbonates, diaryl carbonates or phosgene.
polyacrylate and polymethacrylate polyols.
Polyhydroxy-functional fats and oils, for example natural fats and oils, in particular castor oil; or polyols—so-called oleochemical polyols—obtained by chemical modification of natural fats and oils, for example the epoxy polyesters or epoxy polyethers obtained by epoxidation of unsaturated oils and subsequent ring opening with carboxylic acids or alcohols, or polyols obtained by hydroformylation and hydrogenation of unsaturated oils; or polyols obtained from natural fats and oils by degradation processes such as alcoholysis or ozonolysis and subsequent chemical crosslinking, for example by re-esterification or dimerization of the thus obtained degradation products or derivatives thereof. Suitable degradation products of natural fats and oils are in particular fatty acids and fatty alcohols as well as fatty acid esters, for example, the methyl esters (FAME) that can be derivatized, for example, by hydroformylation and hydrogenation to form hydroxy fatty acid esters.
Polyhydrocarbon polyols, also called oligohydrocarbonols, such as, for example, polyhydroxy functional ethylene-propylene, ethylene-butylene, or ethylene-propylene-diene copolymers, such as, for example, are manufactured by the company Kraton Polymers, or polyhydroxy-functional copolymers derived from dienes such as 1,3-butanediene or diene mixtures and vinyl monomers such as styrene, acrylonitrile, or isobutylene, or polyhydroxy functional polybutadiene polyols such as, for example, those that are prepared by copolymerization of 1,3-butadiene and allyl alcohol and can also be hydrogenated.
Polyhydroxy terminated acrylonitrile-butadiene copolymers, can be synthesized, for example, from epoxides or amino alcohols and carboxyl terminated acrylonitrile-butadiene copolymers (commercially available under the name HYPRO™ (formerly HYCAR®) CTBN and CTBNX from Nanoresins AG, Germany, or Emerald Performance Materials LLC).
amphiphilic block copolymer having at least one hydroxyl group.

In this disclosure, amphiphilic block copolymer having at least one hydroxyl group means a copolymer which contains at least one block segment miscible with epoxy resin and at least one block segment immiscible with epoxy resin. In particular, amphiphilic block copolymers are those disclosed in WO 2006/052725 A1, WO 2006/052726 A1, WO 2006/052727 A1, WO 2006/052728A1, WO 2006/052729 A1, WO 2006/052730 A1, WO 2005/097893 A1, the contents of which is hereby incorporated by reference.

Examples of block segments miscible with epoxy resin are in particular polyethylene oxide, polypropylene oxide, poly(ethylene oxide-co-propylene oxide) and poly(ethylene oxide-ran-propylene oxide) blocks and mixtures thereof.

Examples of block segments immiscible with epoxy resin are, on the one hand, in particular polyether blocks prepared from alkylene oxides having at least 4 C atoms, preferably butylene oxide, hexylene oxide and/or dodecylene oxide. Particularly preferred as such polyether blocks are polybutylene oxide, polyhexylene oxide and polydodecylene oxide blocks and mixtures thereof.

Examples of block segments immiscible with epoxy resin are, on the other hand, polyethylene, polyethylenepropylene, polybutadiene, polyisopren, polydimethylsiloxane and polyalkylmethacrylate blocks and mixtures thereof.

In one embodiment, the amphiphilic block copolymer having at least one hydroxyl group is a block copolymer of ethylene oxide and/or propylene oxide and at least one additional alkylene oxide having at least 4 C atoms, preferably from the group consisting of butylene oxide, hexylene oxide and dodecylene oxide.

In another, preferred, embodiment the amphiphilic block copolymer having at least one hydroxyl group is selected from the group consisting of poly(isoprene-block-ethylene oxide) block copolymers (PI-b-PEO), poly(ethylenepropylene-b-ethylene oxide) block copolymers (PEP-b-PEO), poly(butadiene-b-ethylene oxide) block copolymers (PB-b-PEO), poly(isoprene-b-ethylene oxide-b-isoprene) block copolymers (PI-b-PEO-PI), poly(isoprene-b-ethylene oxide-methylmethacrylate) block copolymers (PI-b-PEO-b-PMMA), and poly(ethylene oxide)-b-poly(ethylene-alt-propylene) block copolymers (PEO-PEP).

In particular, the amphiphilic block copolymers can be present in diblock, triblock or tetrablock form. For multiblocks, i.e., in particular for tri- or tetrablocks, these may be present in linear or branched, in particular in star block, form.

The preparation of the amphiphilic block copolymers is known to a person skilled in the art, for example from *Macromolecules* 1996, 29, 6994-7002, and *Macromolecules* 2000, 33, 9522-9534, and *J. Polym. Sci. Part B: Polym. Phys.* 2007, 45, 3338-3348, the disclosures of which are hereby incorporated by reference. The amphiphilic block has at least one hydroxyl group. The amphiphilic block copolymer may have one or more hydroxyl groups, depending on the preparation method.

If, for example, the polymerization of alkylene oxides is initiated using methanol and terminated using acid, this results in an amphiphilic block copolymer having a hydroxyl group.

On the other hand, if a diol, for example ethylene glycol, is used to initiate the polymerization, an amphiphilic block copolymer having two hydroxyl groups is obtained.

The use of alcohols having three, four, or more hydroxyl groups as starter correspondingly results in amphiphilic block copolymers having three, four, or more hydroxyl groups.

The preparation may be carried out, for example, in a sequential synthesis process in which the first monomer, for example butylene oxide, is first polymerized with the assistance of a starter, followed by addition of the second monomer, for example ethylene oxide, which is polymerized to the end of the resulting polymer of the first monomer. Thus, for example, using a monol as starter, a poly(ethylene oxide)-b-poly(butylene oxide) (PEO-PBO) amphiphilic diblock copolymer may be prepared. The use of a diol results, for example, in a poly(ethylene oxide)-b-poly(butylene oxide)-poly(ethylene oxide) (PEO-PBO-PEO) amphiphilic triblock copolymer.

However, a first monomer, for example butylene oxide, may be polymerized first with the assistance of a starter, followed by addition of a mixture of two or more monomers, for example a mixture of ethylene oxide and butylene oxide, which are polymerized to the end of the resulting polymer of the first monomer. Thus, for example, a poly(ethylene oxide/butylene oxide)-poly(butylene oxide)-poly(ethylene oxide/butylene oxide) (PEO/BO-PBO-PEO/BO) amphiphilic block copolymer may be prepared.

As an example for an amphiphilic block copolymer having at least one hydroxyl group, FORTEGRA™ 100 from Dow Chemical may be mentioned here.

In addition to these mentioned polyols, small amounts of low-molecular, dihydric or polyhydric alcohols, such as, for example, 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, ecanediols, 1,3- and 1,4-cyclohexanedimethanol, hydrogenated bisphenol A, dimeric fatty alcohols, 1,1,1-trimethylolethane, 1,1,1-trimethylolpropane, glycerol, pentaerythritol, sugar alcohols such as xylitol, sorbitol or mannitol, sugars such as saccharose, other polyhydric alcohols, low-molecular alkoxylating products of the above-mentioned dihydric and polyhydric alcohols as well as mixtures of the above-mentioned alcohols can be used simultaneously in the preparation of the polymer $Q_{PM}$. Also, small amounts of polyols with a mean OH functionality of more than 3, for example sugar polyols, can be used simultaneously.

The polymers $Q_{PM}$ are preferably di- or higher-functional polyols having OH equivalent weights from 300 to 6,000 g/OH equivalent, in particular from 600 to 4,000 g/OH equivalent, preferably from 700-2,200 g/OH equivalent. Further, the polyols are preferably selected from the group consisting of polyethylene glycols, polypropylene glycols, polyethylene glycol-polypropylene glycol block copolymers, polybutylene glycols, hydroxyl terminated polybutadienes, hydroxyl terminated butadiene/acrylonitrile copolymers, hydroxyl terminated synthetic rubbers, the hydrogenation products thereof and mixtures of these mentioned polyols.

For certain applications, suitable polymers $Q_{PM}$ are in particular polybutadienes or polyisoprenes having hydroxyl groups or the partially or completely hydrogenated reaction products.

Moreover, also di- or higher functional amino group terminated polyethylene ethers, polypropylene ethers such as are commercially available, for example, under the name JEFFAMINE® from Huntsman, polybutylene ethers, polybutadienes, butadiene/acrylonitrile copolymers such as are commercially available, for example, under the name HYPRO™ (formerly HYCAR®) ATBN from Nanoresins AG, Germany, or Emerald Performance Materials LLC, can be used as polymers $Q_{PM}$.

It is also possible to use hydroxyl, mercapto or amino group terminated polysiloxanes as polymers $Q_{PM}$.

The polymers $Q_{PM}$ can furthermore also undergo chain extension, which can be performed in a manner known to a person skilled in the art by reacting them with polyamines, polyols, and polyisocyanates, in particular diamines, diols, and diisocyanates.

In particular, diols and/or diamines and diisocyanates are preferred for the chain extension. Of course, it is clear to a person skilled in the art that higher functional polyols such as, for example, trimethylolpropane or pentaerythritol, or higher functional polyisocyanates such as isocyanurates of diisocyanates can also be used for chain extension.

For polyurethane polymers in general and for chain-extended polyurethane polymers in particular, it is advantageous to make sure that the polymers do not have too high a viscosity, in particular if higher functional compounds are used for chain extension.

Preferred polymers $Q_{PM}$ are polyols with molecular weights between 600 and 6000 daltons, selected from the group consisting of polyethylene glycols, polypropylene glycols, polyethylene glycol-polypropylene glycol block polymers, polybutylene glycols, hydroxyl terminated polybutadienes, hydroxyl terminated butadiene-acrylonitrile copolymers as well as mixtures thereof.

Particularly preferred polymers $Q_{PM}$ are α,ω-dihydroxypolyalkylene glycols having $C_2$-$C_6$alkylene groups or mixed $C_2$-$C_6$alkylene groups that are terminated by amino, thiol, or preferably hydroxyl groups or a polybutadiene or polyisoprene having hydroxyl groups or a partially or completely hydrogenated reaction product thereof.

Particularly suitable as the polyphenol $Q_{PP}$ are bis-, tris- and tetraphenols. This means not only unsubstituted phenols but optionally also substituted phenols. The nature of the substitution can be quite diverse. In particular, this means a direct substitution on the aromatic ring to which the phenolic OH group is bonded. Phenols furthermore mean not only mononuclear aromatics but also polynuclear or condensed aromatics or heteroaromatics having the phenolic OH group directly on the aromatic or heteroaromatic ring.

Bisphenols and trisphenols are especially suitable. For example, suitable bisphenols or trisphenols are 1,4-dihydroxybenzene, 1,3-dihydroxybenzene, 1,2-dihydroxybenzene, 1,3-dihydroxytoluene, 3,5-dihydroxybenzoates, 2,2-bis(4-hydroxyphenyl)propane (=bisphenol A), bis(4-hydroxyphenyl)methane (=bisphenol F), bis(4-hydroxyphenyl)sulfone (=bisphenol S), naphthoresorcinol, dihydroxynaphthalene, dihydroxyanthraquinone, dihydroxybiphenyl, 3,3-bis(p-hydroxyphenyl)phthalide, 5,5-bis (4-hydroxyphenyl)hexahydro-4,7-methanoindane, phenolpthalein, fluorescein, 4,4'-[bis-(hydroxyphenyl)-1,3-phenylenebis-(1-methylethylidene)] (=bisphenol M), 4,4'-[bis-(hydroxyphenyl)-1,4-phenylenebis-(1-methylethylidene)] (=bisphenol P), 2,2'-diallyl bisphenol A, diphenols and dicresols prepared by reacting phenols or cresols with diisopropylidene benzene, phloroglucinol, gallic acid esters, phenol or cresol novolacs with —OH functionalities from 2.0 to 3.5 as well as all isomers of the above-mentioned compounds.

Preferred diphenols and dicresols prepared by reacting phenols or cresols with diisopropylidene benzene have a chemical structural formula as accordingly shown below for cresol as an example:

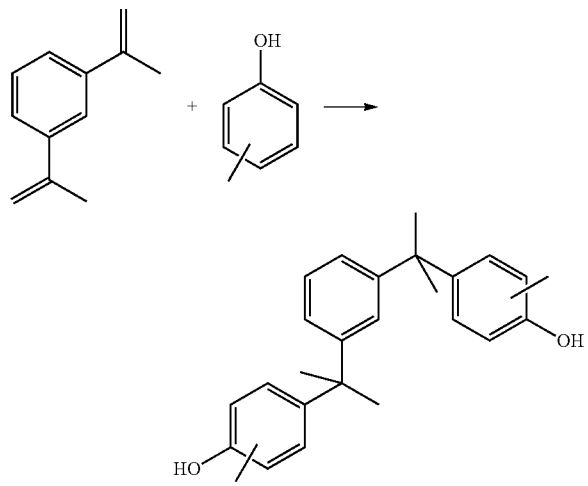

Low-volatility bisphenols are especially preferred. Bisphenol M, bisphenol S, and 2,2'-diallyl bisphenol A are considered as most preferred.

$Q_{PP}$ preferably has 2 or 3 phenol groups.

At least one polyisocyanate is used to synthesize the polyurethane prepolymer. The polyisocyanate used for this purpose is in particular a diisocyanate or triisocyanate.

Aliphatic, cycloaliphatic or aromatic polyisocyanates, in particular diisocyanates, can be used as polyisocyanates. Particularly suitable are the following:

1,6-hexamethylene diisocyanate (HDI), 2-methylpentamethylene 1,5-diisocyanate, 2,2,4- and 2,4,4-trimethyl-1,6-hexamethylene diisocyanate (TMDI), 1,10-decamethylene diisocyanate, 1,12-dodecamethylene diisocyanate, lysine and lysine ester diisocyanate, cyclohexane 1,3- and -1,4-diisocyanate and any mixture of these isomers, 1-methyl-2,4- and -2,6-diisocyanatocyclohexane and any mixture of these isomers ($HTD_1$ or $H_6TDI$), 1-isocyanato-3,3,5-trimethyl-5-isocyanatomethylcyclohexane (=isophorone diisocyanate or IPDI), perhydro-2,4'- and -4,4'-diphenylmethane diisocyanate (HMDI or $H_{12}MDI$), 1,4-diisocyanato-2,2,6-trimethylcyclohexane (TMCDI), 1,3- and 1,4-bis-(isocyanatomethyl)cyclohexane, m- and p-xylylene diisocyanate (m- and p-XDI), m- and p-tetramethyl-1,3- and -1,4-xylylene diisocyanate (m- and p-TMXDI), bis-(1-isocyanato-1-methylethyl)-naphthalene.

2,4- and 2,6-toluoylene diisocyanate and any mixture of these isomers (TDI), 4,4'-, 2,4'- and 2,2'-diphenylmethane diisocyanate and any mixture of these isomers (MDI), 1,3- and 1,4-phenylene diisocyanate, 2,3,5,6-tetramethyl-1,4-diisocyanatobenzene, naphthalene-1,5-diisocyanate (NDI), 3,3'-dimethyl-4,4'-diisocyanatodiphenyl (TODD, dianisidine diisocyanate (DADI).

Oligomers (e.g. biurets, isocyanurates) and polymers of the above-mentioned monomeric diisocyanates.

Any mixture of the above-mentioned polyisocyanates.

Monomeric diisocyanates, in particular MDI, TDI, HDI, and IPDI, are preferred.

In one embodiment, Michael acceptors suited for the preparation of an impact strength modifier according to the present disclosure have the formula (I) or (Ia)

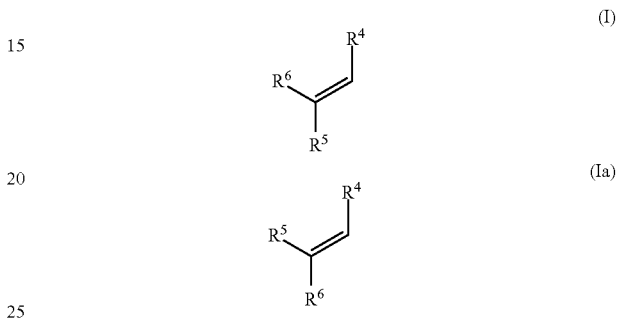

wherein
$R^4$ is a hydrogen atom or a moiety selected from the group consisting of $R^7$, —$COOR^7$, and —CN,
$R^5$ is a moiety selected from the group consisting of $COOR^7$, $CONH_2$, $CONHR^7$, $CONR^7_2$, CN, $NO_2$, $PO(OR^7)_2$, $SO_2R^7$ and $SO_2OR^7$, and
$R^6$ is a hydrogen atom or a moiety selected from the group consisting of —$CH_3$, —$R^7$, —$COOR^7$ and —$CH_2COOR^7$, wherein $R^7$ is a univalent hydrocarbon moiety having from 1 to 20 carbon atoms.

In another embodiment, the Michael acceptor reacted with the polyurethane prepolymer having isocyanate groups has a hydroxyl group.

According to the present disclosure, the Michael acceptor having a hydroxyl group has in particular the formula (VII) or (VIIa).

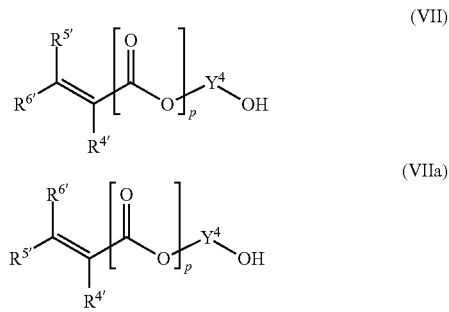

wherein
$R^{4'}$ is a hydrogen atom or a moiety selected from the group consisting of $R^7$, —$COOR^7$, and —CN,
$R^{5'}$ is a moiety selected from the group consisting of $COOR^7$, $CONH_2$, $CONHR^7$, $CONR^7_2$, CN, $NO_2$, $PO(OR^7)_2$, $SO_2R^7$, and $SO_2OR^7$, and
$R^{6'}$ is a hydrogen atom or a moiety selected from the group consisting of —$R^7$, —$COOR^7$, —$CH_2COOR^7$, and —CN, wherein $R^7$ is a univalent hydrocarbon moiety having from 1 to 20 carbon atoms;

$Y^4$ is an alkylene group having from 1 to 6 carbon atoms or provided that p and p'=0 is nothing; and p represents 0 or 1.

Particularly preferred embodiments of compounds of the formulas (VII) and (VIIa) are those compounds wherein $Y^4$ is nothing and p is 0 (vinyl alcohol); $Y^4$ is $CH_2$ and p is 0 (allyl alcohol); $Y^4$ is $CH_2CH_2$ and p is 1, $R^{4'}$ is H or $CH_3$ (hydroxyethyl(meth)acrylate (HEA) (HEMA)); $Y^4$ is propylene and p is 1, $R^{4'}$ is H or $CH_3$ (hydroxypropyl(meth)acrylate (HPA) (HPMA)); $Y^4$ is butylene, p is 1, $R^{4'}$ is H or $CH_3$ (hydroxybutyl(meth)acrylate).

Examples of suitable Michael acceptors are maleic or fumaric acid diesters such as dimethyl maleate, diethyl maleate, dibutyl maleate, diethyl fumarate; citraconic acid diesters such as dimethyl citraconate; acrylic or methacrylic acid esters such as methyl(meth)acrylate, ethyl(meth)acrylate, butyl(meth)acrylate, lauryl(meth)acrylate, stearyl(meth)acrylate, tetrahydrofuryl(meth)acrylate, isobornyl(meth)acrylate; acrylic or methacrylic acid amides such as (meth)acrylamide, methyl(meth)acrylamide, butyl(meth)acrylamide, dimethyl(meth)acrylamide, dibutyl(meth)acrylamide; itaconic acid diesters such as dimethyl itaconate; cinnamic acid esters such as methyl cinnamate; vinylphosphonic acid diesters such as vinylphosphonic acid dimethylester; vinylsulfonic acid esters, in particular vinylsulfonic acid aryl esters; vinyl sulfones; vinylnitriles such as acrylonitrile, crotonitrile, 2-pentenenitrile or fumaronitrile; 1-nitroethylenes such as β-nitrostyrene; and Knoevenagel condensation products such as, for example, those formed from malonic acid diesters and aldehydes such as formaldehyde, acetaldehyde, or benzaldehyde. Especially suitable are maleic acid diesters, (meth)acrylic acid esters, (meth)acrylic acid amides, phosphonic acid diesters and vinylnitriles.

Preferred Michael acceptors are maleic acid dimethyl, maleic acid diethyl and maleic acid dibutyl ester, (meth)acrylic acid tetrahydrofurfuryl, (meth)acrylic acid isobornyl, (meth)acrylic acid hexyl, (meth)acrylic acid lauryl, (meth)acrylic acid stearyl, (meth)acrylic acid-2-hydroxyethyl and (meth)acrylic acid-3-hydroxypropyl ester, (meth)acrylamide, N-methyl(meth)acrylamide, N,N-dimethyl(meth)acrylamide, phosphonic acid dimethyl, phosphonic acid diethyl and phosphonic acid dibutylester, acrylonitrile, 2-pentenenitrile, fumaronitrile and β-nitrostyrene and mixtures of these compounds.

In one embodiment, the impact strength modifier according to the present disclosure has the general formula (II)

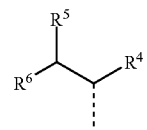

wherein $R^4$ is a hydrogen atom or a moiety selected from the group consisting of $R^7$, —$COOR^7$, and —CN, $R^5$ is a moiety selected from the group consisting of $COOR^7$, $CONH_2$, $CONHR^7$, $CONR^7{}_2$, CN, $NO_2$, $PO(OR^7)_2$, $SO_2R^7$ and $SO_2OR^7$, and $R^6$ is a hydrogen atom or a moiety selected from the group consisting of —$R^7$, —$COOR^7$, —$CH_2COOR^7$, and —CN, wherein $R^7$ is a univalent hydrocarbon moiety having from 1 to 20 carbon atoms;

$Y^4$ is an alkylene group having from 1 to 6 carbon atoms or provided that p and p'=0 is nothing; and $Y^5$ is a divalent moiety of the formula (IV) or (IV');

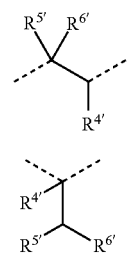

wherein $R^{4'}$ is a hydrogen atom or a moiety selected from the group consisting of $R^7$, —$COOR^7$, and —CN, $R^{5'}$ is a moiety selected from the group consisting of $COOR^7$, $CONH_2$, $CONHR^7$, $CONR^7{}_2$, CN, $NO_2$, $PO(OR^7)_2$, $SO_2R^7$, and $SO_2OR^7$, and $R^{6'}$ is a hydrogen atom or a moiety selected from the group consisting of —$R^7$, —$COOR^7$, —$CH_2COOR^7$, and —CN, wherein $R^7$ is a univalent hydrocarbon moiety having from 1 to 20 carbon atoms;

p and p' are each 0 or 1;

q and q' are each 0 or 1;

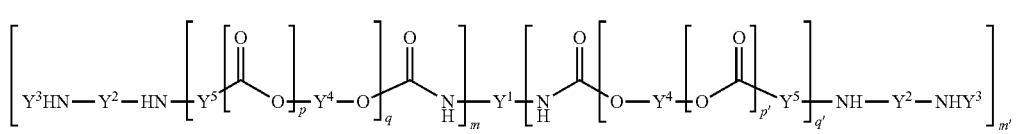

wherein $Y^1$ is a linear or branched polyurethane prepolymer terminated with m+m' isocyanate groups, after removal of all terminal isocyanate groups;

$Y^2$ is a divalent group of a polyoxyalkylene having $C_2$-$C_6$alkylene groups, a polybutadiene, a butadiene/acrylonitrile copolymer or a synthetic rubber;

$Y^3$ independently of one another is H or an alkyl group having from 1 to 10 carbon atoms or a moiety of the formula (III), m and m' are each values from 0 to 7, preferably 0 or 1 or 2, provided that m+m' are a value from 1 to 8, in particular 1 or 2.

The dotted lines in the formulas of this disclosure in each case represent the bond between the respective substituent and the corresponding moiety of the molecule.

Provided that q and q'=0, formula (II) simplifies to formula (V), i.e.

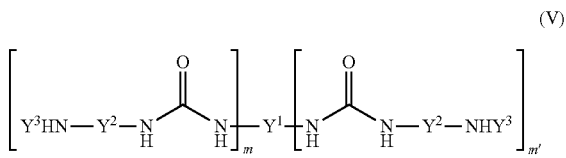

(V)

wherein $Y^1$ is a linear or branched polyurethane prepolymer terminated with m+m' isocyanate groups, after removal of all terminal isocyanate groups;

$Y^2$ is a divalent group of a polyalkoxylene having $C_2$-$C_6$ alkylene groups, a polybutadiene, a butadiene/acrylonitrile copolymer or a synthetic rubber; and $Y^3$ independently of one another is H or an alkyl group having from 1 to 10 carbon atoms or a moiety of the formula (VI),

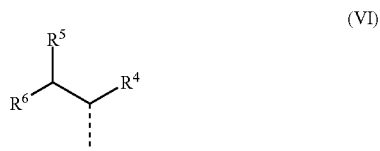

(VI)

wherein $R^4$ is a hydrogen atom or a moiety selected from the group consisting of $R^7$, —$COOR^7$, and —CN, $R^5$ is a moiety selected from the group consisting of $COOR^7$, $CONH_2$, $CONHR^7$, $CONR^7_2$, CN, $NO_2$, $PO(OR^7)_2$, $SO_2R^7$ and $SO_2OR^7$, and $R^6$ is a hydrogen atom or a moiety selected from the group consisting of —$R^7$, —$COOR^7$, —$CH_2COOR^7$, and —CN, wherein $R^7$ is a univalent hydrocarbon moiety having from 1 to 20 carbon atoms;

m and m' are each values from 0 to 7, preferably 0 or 1 or 2, provided that m+m' are a value from 1 to 8, in particular 1 or 2.

In another embodiment, the impact strength modifier according to the present disclosure is the reaction product obtained from the reaction of the polyurethane prepolymer having isocyanate groups and the Michael acceptor is further reacted with a primary diamine and subsequently optionally with a Michael acceptor, or with a secondary diamine prepared by reaction with a Michael acceptor, wherein the primary amine has a molecular weight of 100-4,000 g/mol, preferably 400-3,000 g/mol, particularly preferred of 600-2,200 g/mol.

In a second aspect, the present disclosure pertains to an amino group terminated impact strength modifier prepared by reacting a polyurethane prepolymer having isocyanate groups, a primary diamine, and optionally at least one Michael acceptor, wherein the polyurethane prepolymer having isocyanate groups is prepared from at least one polyisocyanate and at least one polyester or polyether polyol having at least two hydroxyl groups, provided that if the primary diamine has a molecular weight of less than 600 g/mol, it is compulsory that a Michael acceptor is involved in the preparation of the amino group terminated impact strength modifier and, in comparison to the polyurethane prepolymer having isocyanate groups, the primary diamine is used such that the ratio of isocyanate groups to amino groups is less than 0.5.

In particular, the ratio of isocyanate groups to amino groups is less than 0.4, preferably less than 0.25.

In a third aspect, the present disclosure pertains to a process for preparing the impact strength modifier according to the present disclosure or the amino group terminated polyurethane and the compounds prepared therefrom. According to the present disclosure, the amino group terminated impact strength modifier is prepared by reacting a polyurethane prepolymer having isocyanate groups, a primary diamine, and optionally at least one Michael acceptor. This opens up many possibilities for the reaction sequence and the resultant products.

In order to further clarify the synthesis of the impact strength modifier according to the present disclosure, in particular the following reaction routes have been found to be advantageous:

Reaction scheme I:

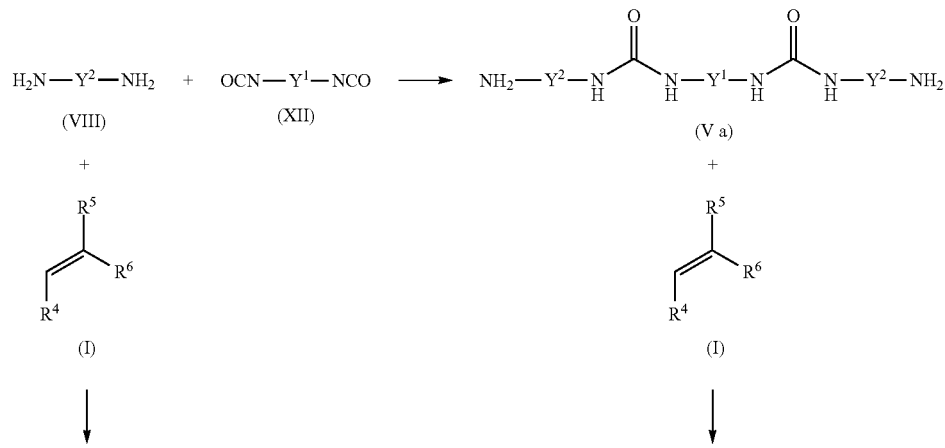

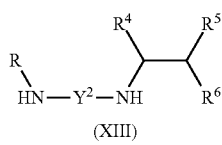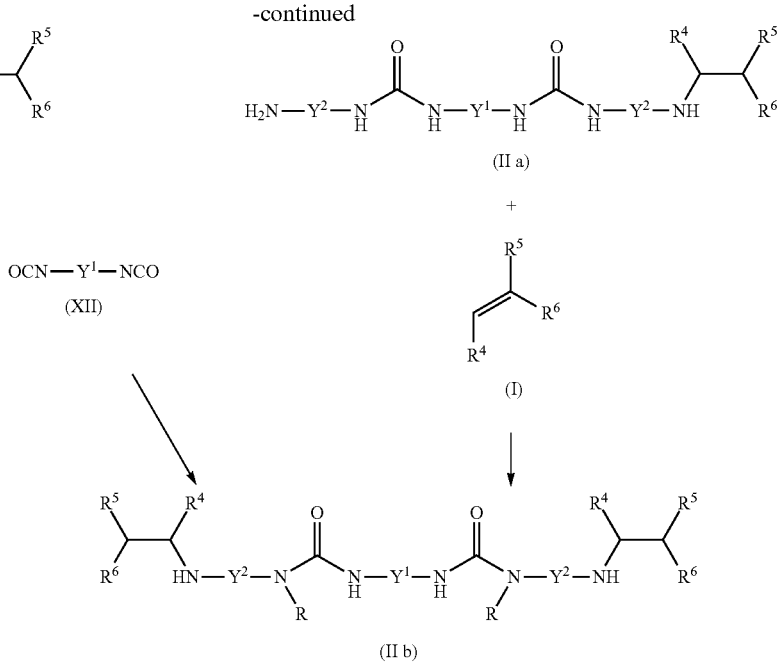

According to reaction scheme I, first a primary diamine of the formula (VIII) is reacted with a polyurethane prepolymer having isocyanate groups of the formula (XII) to yield the amino group terminated impact strength modifier (V a) according to the present disclosure. In this case the amino group terminated impact strength modifier has primary amino groups.

Here, the diamine of the formula (VIII) is used in stoichiometric excess, in particular in a ratio of $NH_2$ groups to NCO groups greater than 2, in particular greater than 2.5, preferably greater than 4, relative to the polyurethane prepolymer of the formula (XII). This ensures a reliable formation of a simple adduct and prevents the formation of higher-molecular oligomeric addition products.

Alternatively, the primary diamine (VIII) reacts with the Michael acceptor of the formula (I) in a first reaction step to yield the secondary amine of the formula (XIII). Depending on the stoichiometry of the primary amine (VIII) with respect to the Michael acceptor of the formula (I), R in formula (XIII) and formula (II b) represents H or a substituent of the formula (VI). In a further step, this secondary amine of the formula (XIII) can be reacted with a polyurethane prepolymer having isocyanate groups of the formula (XII) to yield the amino group terminated impact strength modifier according to the present disclosure of the formula (II b). In this case the amino group terminated impact strength modifier has secondary amino groups.

Alternatively, this amino group terminated impact strength modifier of the formula (II b) is obtainable by reacting the impact strength modifier of the formula (V a) with the Michael acceptor of the formula (I). Here, depending on the used amount of the Michael acceptor of the formula (I) an amino group terminated impact strength modifier of the formula (II a) or (II b) is obtained. In the first case the amino group terminated impact strength modifier has both primary and secondary amino groups; in the latter case both primary amino groups of the amino group terminated impact strength modifier of the formula (V a) have been reacted with the Michael acceptor to yield secondary amino groups.

Reaction scheme II:

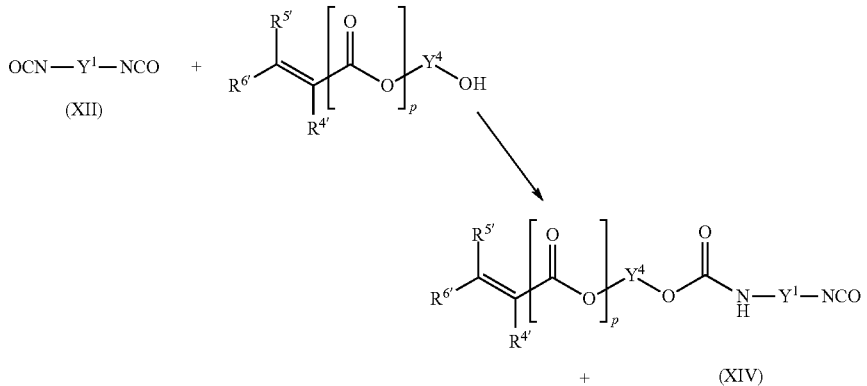

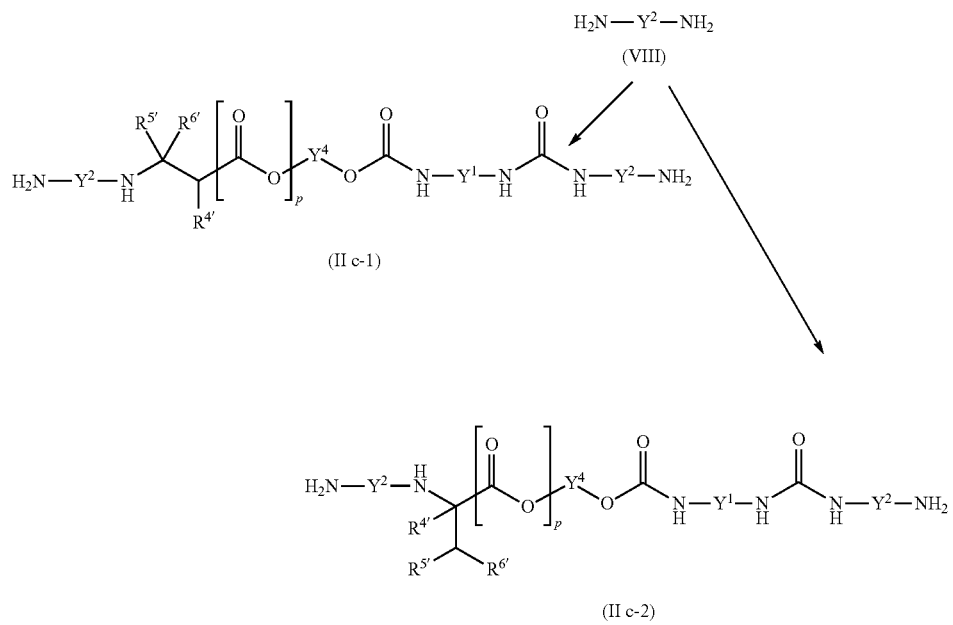

New manufacturing routes ensue if a Michael acceptor containing hydroxyl groups is used as Michael acceptor. In particular the reaction schemes II and III illustrate such reaction routes on the basis of the Michael acceptor containing hydroxyl groups according to formula (VII).

According to reaction scheme II, a polyurethane prepolymer having isocyanate groups of the formula (XII) is reacted with the Michael acceptor containing hydroxyl groups according to formula (VII). If the amount of the Michael acceptor containing hydroxyl groups according to formula VII is selected such that the ratio of the number of hydroxyl groups of the Michael acceptor to the number of isocyanate groups of the polyurethane prepolymer having isocyanate groups of the formula (XII) is 0.5, this reaction will quantitatively yield the intermediate product containing isocyanate groups of the formula (XIV) to which a primary diamine of the formula (VIII) is added (in excess) in a subsequent reaction step. Depending on the addition of this diamine to the double bond of the intermediary product of the formula (XIV), the impact strength modifiers according to the present disclosure of the formula (II c-1) or the formula (II c-2) are formed in this reaction.

Reaction scheme III:

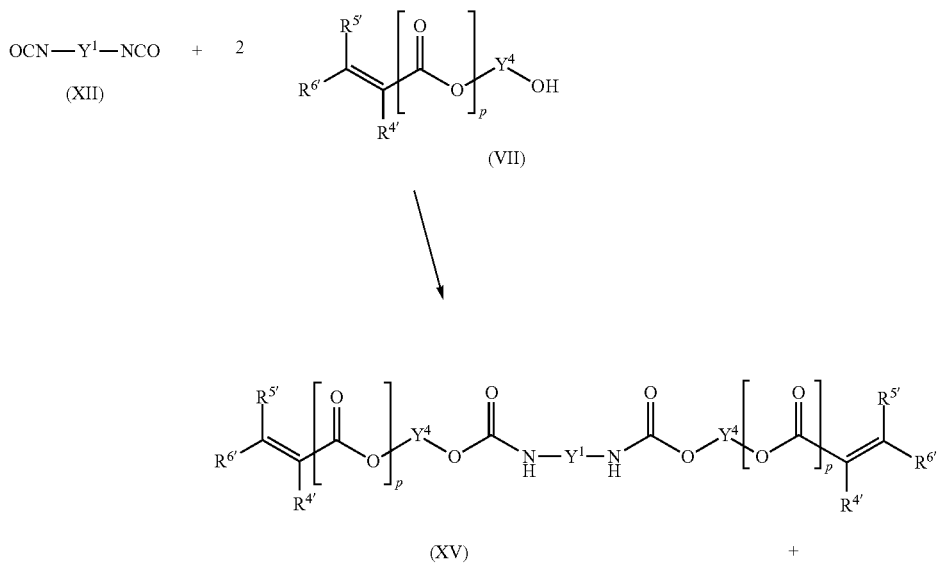

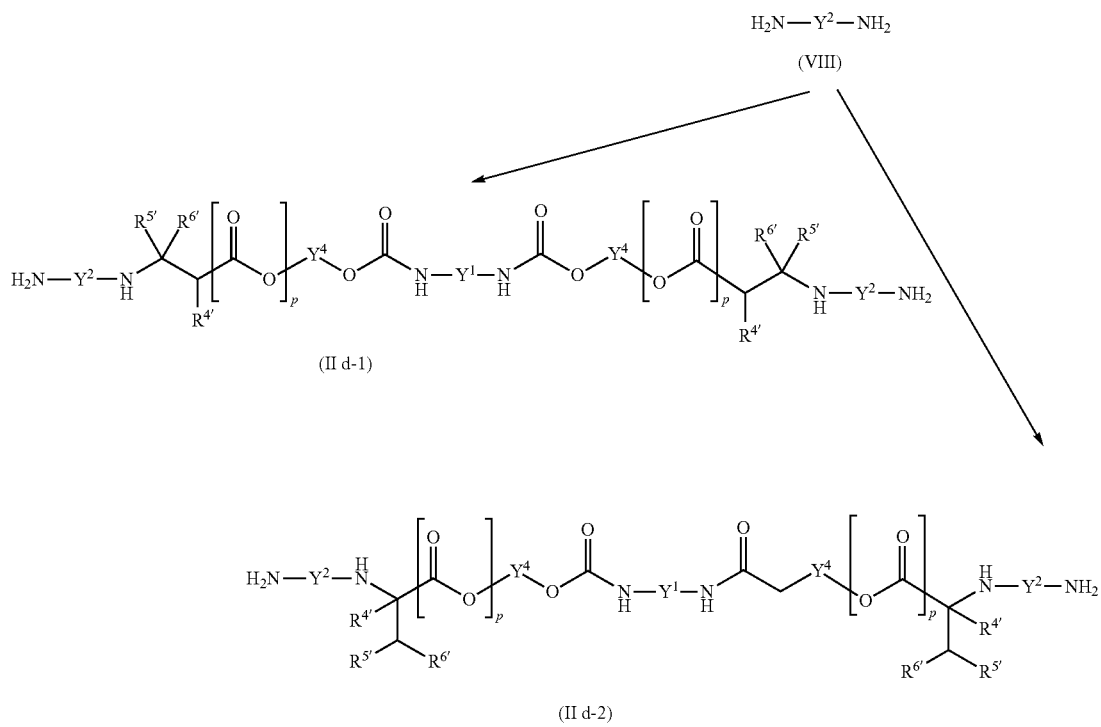

If a Michael acceptor containing hydroxyl groups according to formula (VII) is reacted with a polyurethane prepolymer having isocyanate groups according to formula (XII) stoichiometrically or in stoichiometric excess relative to the Michael acceptor containing hydroxyl groups (i.e. the ratio of the number of hydroxyl groups of the Michael acceptor to the number of isocyanate groups of the polyurethane prepolymer having isocyanate groups of the formula (XII) has a value ≥ 1), the intermediate product according to formula (XV) is formed quantitatively as illustrated in reaction scheme III.

In another reaction step according to reaction scheme III, the intermediate product according to formula (XV) is reacted with a primary diamine of the formula (VIII). Depending on the addition of this diamine to the double bonds of the intermediary product of the formula (XV), the impact strength modifiers according to the present disclosure of the formula (II d-1) or the formula (II d-2) are formed in this reaction.

It is clear to a person skilled in the art that if a Michael acceptor containing hydroxyl groups according to formula (VII) and a polyurethane prepolymer having isocyanate groups of the formula (XII) are used in the reaction such that the ratio of the number of hydroxyl groups of the Michael acceptor to the number of isocyanate groups of the polyurethane prepolymer having isocyanate groups of the formula (XII) has a value between 0.5 and 1, a mixture of the reaction product of the formula (XIV) illustrated in reaction scheme II and the reaction product (XV) illustrated in reaction scheme III are formed, which, after a further reaction with a primary diamine of the formula (VIII), results in the formation of a mixture of the impact strength modifiers according to the present disclosure of the formula (II c-1) or, depending on the addition of the diamine to the double bonds of the intermediate product, of the formula (II c-2) and the formula (II d-1) or, depending on the addition of the diamine to the double bonds of the intermediate product, of the formula (II d-2).

It should be noted that the Michael acceptor according to formula (VII) is a preferred embodiment of a Michael acceptor, namely a hydroxyl containing Michael acceptor. Hence, the synthetic pathway illustrated in reaction scheme III offers the possibility to achieve a direct reaction of the Michael acceptor and the polyurethane prepolymer having isocyanate groups, which results in the integration of the structural element originating from the Michael acceptor in the polymer backbone chain (polymer backbone) of the amino group terminated impact strength modifier in a greater distance from the polymer end as opposed to the synthetic pathway according to reaction scheme I.

In a fourth aspect, the present disclosure pertains to a two-component epoxy resin composition containing one component K1 comprising at least one epoxy resin A that contains on average more than one epoxy group per molecule;

one component K2 comprising a hardener B for epoxy resins; and at least one amino group terminated impact strength modifier C in component K2.

The epoxy resin A that contains on average more than one epoxy group per molecule is preferably a liquid epoxy resin or a solid epoxy resin. The term "solid epoxy resin" is very well known to a person skilled in the art of epoxides and is used in contrast to "liquid epoxy resins". The glass transition temperature of solid resins is above room temperature, i.e. they can be comminuted to free-flowing powders at room temperature.

Preferred solid epoxy resins have the formula (IX)

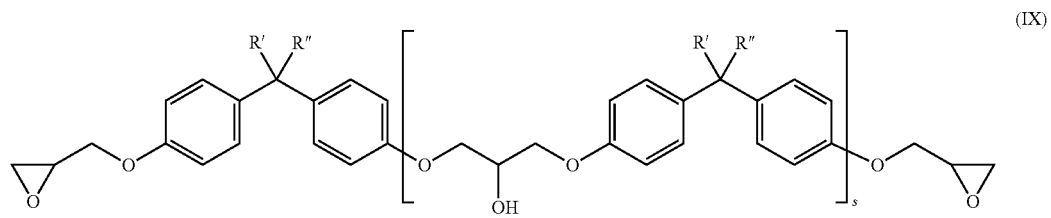

(IX)

In this formula, the substituents R' and R" are each independently H or CH$_3$. In addition, the index s has a value of >1.5, in particular of 2 to 12.

Such solid epoxy resins are commercially available, for example from Dow, Huntsman or Hexion.

Compounds of the formula (IX) with an index s between 1 and 1.5 are referred to by a person skilled in the art as semi-solid epoxy resins. For this present disclosure, they are likewise considered to be solid resins. However, preferred are epoxy resins in the narrower sense, i.e. the index s has a value of >1.5.

Preferred liquid epoxy resins have the formula (X)

with

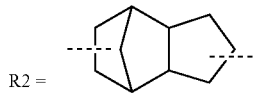

or CH$_2$, R1=H or methyl and z=0 to 7.

In particular, they are phenol or cresol novolacs (R2=CH$_2$).

Such epoxy resins are commercially available under the trade names EPN or ECN as well as TACTIX® 556 from Huntsman or under the product line D.E.N.™ from Dow Chemical.

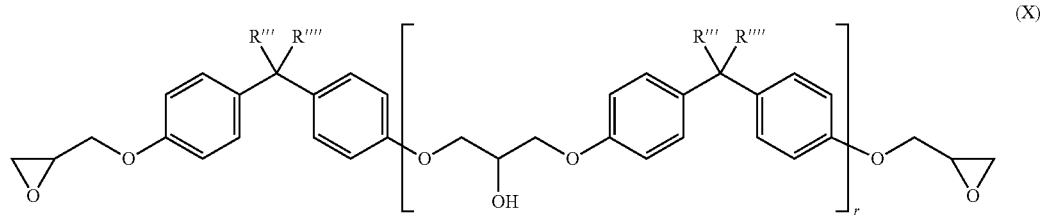

(X)

In this formula, the substituents R''' and R'''' are each independently H or CH$_3$. In addition, the index r has a value of 0 to 1. Preferably, r has a value of less than 0.2.

These are thus preferably diglycidyl ethers of bisphenol A (DGEBA), of bisphenol F and of bisphenol A/F (here, the designation "A/F" refers to a mixture of acetone with formaldehyde which is used as the reactant in the preparation thereof). Such liquid resins are available, for example, as ARALDITE® GY 250, ARALDITE® PY 304, ARALDITE® GY 282 (Huntsman), or D.E.R.™ 331, or D.E.R.™ 330 (Dow), or EPIKOTE 828 (Hexion).

Moreover, so-called novolacs A are suitable epoxy resins. These have in particular the following formula:

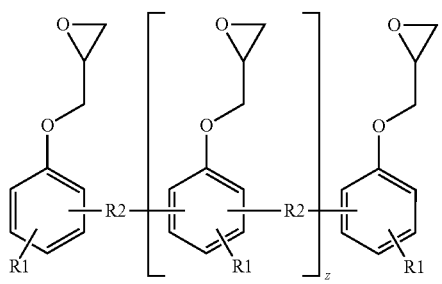

Preferably, the epoxy resin A is a liquid epoxy resin of the formula (X). In an even more preferred embodiment, the heat-curing epoxy resin composition contains at least one liquid epoxy resin of formula (X) as well as at least one solid epoxy resin of formula (IX).

The proportion of epoxy resin A is preferably 10-85% by weight, in particular 15-70% by weight, preferably 15-60% by weight, based on the weight of the composition.

The composition according to the present disclosure additionally contains at least one hardener B for epoxy resins. This hardener is preferably a compound selected from the group consisting of poly(ethyleneimines), polyamidoamines, amino group terminated butadiene/acrylonitrile copolymers and polyamines.

Polyamines are in particular polyoxyalkylenediamines having molecular weights of less than 500 g/mol (JEFFAMINE® D-230, JEFFAMINE® D400, JEFFAMINE® EDR-148), 4,7,10-trioxamidecane-1-13-diamine, 4,9-dioxadodecane-1,12-diamines, ethylendiamine, and/or 3(4),8(9)-bis(aminomethyl)tricyclo[5.2.1.0$^{2,6}$]decane (TCD-DIAMIN®, manufactured by Celanese Chemicals). It has been shown that in particular polyethyleneimines having a molecular weight Mw of less than 100,000 g/mol, in particular of less than 50,000 g/mol are particularly suitable.

In one embodiment, the two-component epoxy resin composition contains at least one additional impact strength modifier D. This impact strength modifier D can be selected, for example, from the following:

The impact strength modifier D is a liquid rubber containing an epoxy terminated polymer, in particular an epoxy terminated acrylonitrile/butadiene copolymer and a component of the epoxy resin component K1, in particular in an amount from 1 to 45% by weight, based on the weight of the epoxy resin component K1.

The impact strength modifier D is a polymer of the formula (XI)

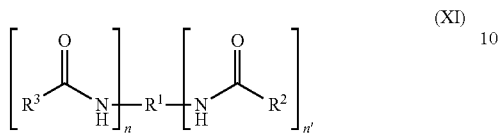

If the substituents $R^2$ and $R^3$ are reactive toward epoxy groups, the impact strength modifier D of the formula (XI) is a part of the hardener component K2. If the substituents $R^2$ and $R^3$ are reactive toward amino groups, the impact strength modifier D of the formula (XI) is a part of the hardener component K1. If the substituents $R^2$ and $R^3$ are not reactive toward epoxy groups at room temperature and not reactive toward the amino groups, the impact strength modifier D of the formula (XI) is a part of the epoxy resin component K1 and/or the hardener component K2. The proportion of the impact strength modifier D of formula (XI) is preferably used in an amount of from 1 to 45% by weight, in particular from 10 to 30% by weight, based on the weight of the respective component K1 and/or K2.

The impact strength modifier D is an amino group terminated acrylonitrile/butadiene copolymer and a part of the hardener component K2, in particular in an amount of from 10 to 40% by weight, based on the weight of the hardener component K2.

In one embodiment the impact strength modifier D has the formula (XI).

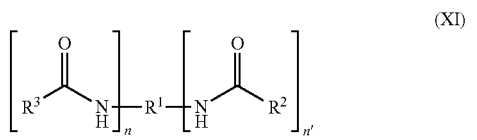

In formula (XI):

n and n' independently of one another are values of from 0 to 7, preferably 0 or 1 or 2, provided that n+n' are a value of from 1 to 8, in particular 1 or 2;

$R^1$ is a linear or branched polyurethane prepolymer terminated with n+n' isocyanate groups, after removal of all terminal isocyanate groups;

$R^2$ and $R^3$ each independently of one another represent a substituent selected from the group consisting of

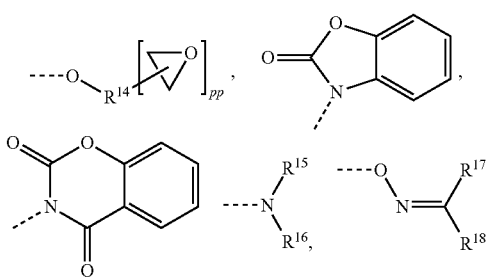

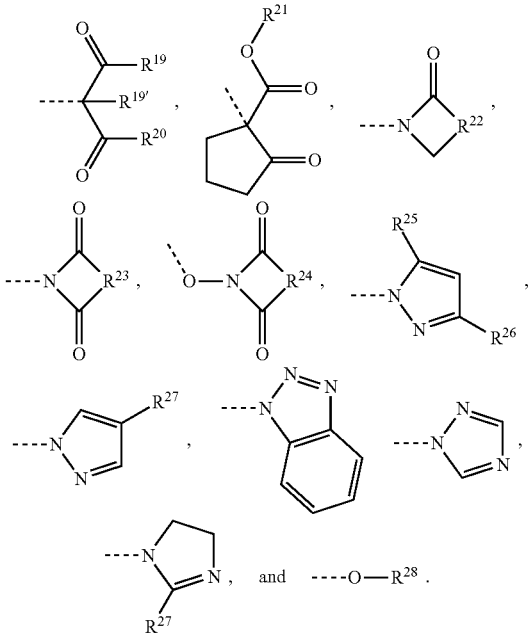

Here, $R^{14}$ is in turn a moiety of an aliphatic, cycloaliphatic, aromatic, or araliphatic epoxy containing a primary or secondary hydroxyl group, after removal of the hydroxy or epoxy groups, and pp represents the values 1, 2 or 3.

In the present disclosure, an "araliphatic moiety" is defined as an aralkyl group, i.e. an alkyl group substituted by aryl groups (cf. Römpp, C D Römpp Chemie Lexikon, Version 1, Stuttgart/New York, Georg Thieme Verlag 1995).

Moreover, $R^{15}$, $R^{16}$, $R^{17}$ and $R^{18}$ each independently of one another represent an alkyl or cycloalkyl or aralkyl or arylalkyl group or else $R^{15}$ together with $R^{16}$, or $R^{17}$ together with $R^{18}$ forms a part of an optionally substituted 4- to 7-membered ring.

Moreover, $R^{19}$, $R^{19'}$ and $R^{20}$ each independently of one another represent an alkyl or aralkyl or arylalkyl group or an alkyloxy or aryloxy or aralkyloxy group, and $R^{11}$ represents an alkyl group.

$R^{23}$ and $R^{24}$ each independently of one another represent an alkylene group having from 2 to 5 C atoms which optionally has double bonds or is substituted, or a phenylene group or a hydrogenated phenylene group, and $R^{25}$, $R^{26}$, and $R^{27}$ each independently of one another represent H or an alkyl group or an aryl group or an aralkyl group.

Finally, $R^{28}$ represents an aralkyl group or a mono- or polynuclear substituted or unsubstituted aromatic group which optionally has aromatic hydroxyl groups.

Phenols or bisphenols, after removal of a hydroxyl group, are in particular firstly to be considered as $R^{28}$. In particular phenol, cresol, resorcinol, catechol, cardanol (3-pentadecenylphenol (from cashew nutshell oil)), nonylphenol, phenols reacted with styrene or dicyclopentadiene, bisphenol A, bisphenol F, and 2,2'-diallylbisphenol A examples of such phenols and bisphenols.

Hydroxybenzyl alcohol and benzyl alcohol, after removal of a hydroxyl group, are in particular secondly to be considered as $R^{28}$.

If $R^{15}$, $R^{16}$, $R^{17}$, $R^{18}$, $R^{19}$, $R^{19'}$, $R^{20}$, $R^{21}$, $R^{25}$, $R^{26}$, or $R^{27}$ represents an alkyl group, the latter is in particular a linear or branched $C_1$-$C_{20}$ alkyl group.

If $R^{15}$, $R^{16}$, $R^{17}$, $R^{18}$, $R^{19}$, $R^{19'}$, $R^{20}$, $R^{25}$, $R^{26}$, $R^{27}$, or $R^{28}$ represents an aralkyl group, the latter group is in particular an aromatic group bonded through methylene, in particular a benzyl group.

If $R^{15}$, $R^{16}$, $R^{17}$, $R^{18}$, $R^{19}$, $R^{19'}$ or $R^{20}$ represents an alkylaryl group, the latter group is in particular a $C_1$ to $C_{20}$ alkyl group bonded through phenylene such as, for example, tolyl or xylyl.

Particularly preferred moieties $R^2$ and/or $R^3$ are moieties selected from the group consisting of

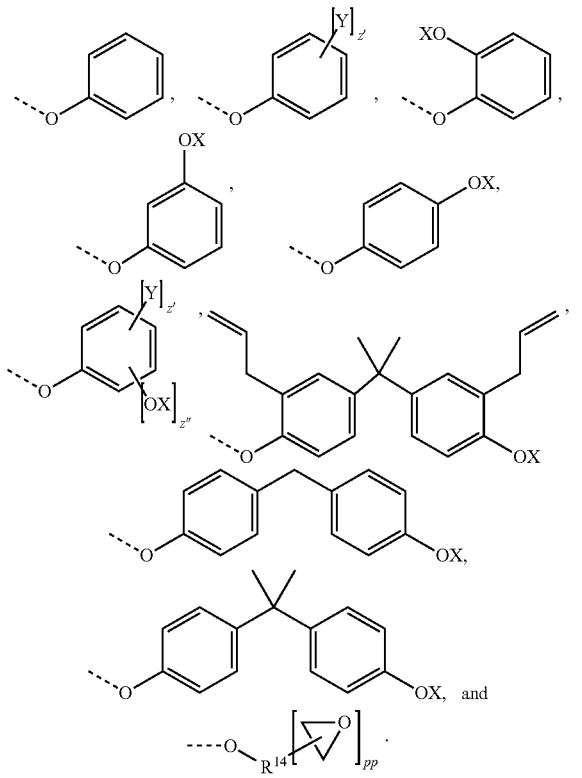

Here, the moiety Y stands for a saturated or olefinically unsaturated hydrocarbon moiety with 1 to 20 C atoms, in particular with 1 to 15 C atoms. Preferred Y are in particular an allyl group, a methyl group, a nonyl group, a dodecyl group or an unsaturated $C_{15}$ alkyl group having from 1 to 3 double bonds.

The moiety R represents an alkyl, aryl, aralkyl group, in particular H or methyl.

The indices z' and z" represent the values 0, 1, 2, 3, 4, or 5 provided that the sum z'+z" stands for a value between 1 and 5.

Preferably, the substituents $R^2$ and $R^3$ are identical.

The impact strength modifier D of the formula (XI) is prepared from the linear or branched polyurethane prepolymer terminated with n+n' isocyanate groups and one or several isocyanate reactive compounds $R^2H$ and/or $R^3H$. If several of such isocyanate reactive compounds are used, the reaction can proceed sequentially or with a mixture of these compos.

Moreover, the two-component epoxy resin composition may comprise further components. These are, for example:

solvents, film forming auxiliaries or extenders such as toluene, xylene, methylethyl ketone, 2-ethoxyethanol, 2-ethoxyethyl acetate, benzyl alcohol, ethylene glycol, diethylene glycol butyl ether, dipropylene glycol butyl ether, ethylene glycol butyl ether, ethylene glycol phenyl ether, N-methylpyrrolidone, propylene glycol butyl ether, propylene glycol phenyl ether, diphenylmethane, diisopropylnaphthalene, mineral oil fractions such as, for example, Solvesso types (from Exxon), aromatic hydrocarbon resins, in particular phenol group containing types, sebacates, phthalates, organic phosphoric and sulfonic esters and sulfonamides;

reactive dilutants, e.g., epoxy reactive dilutants which have been mentioned above, epoxidized soy oil or flax oil, compounds having acetoacetate groups, in particular acetoacetylated polyols, butyrolactone as well as, moreover, isocyanates and silicones having reactive groups;

polyamines such as, for example
♦ aliphatic, cycloaliphatic or arylaliphatic primary diamines, e.g., ethylenediamine, 1,2-propanediamine, 1,3-propanediamine, 2-methyl-1,2-propanediamine, 2,2-dimethyl-1,3-propanediamine, 1,3-butanediamine, 1,4-butanediamine, 1,3-pentanediamine (DAMP), 1,5-pentanediamine, 1,5-diamino-2-methylpentane (MPMD), 2-butyl-2-ethyl-1,5-pentanediamine (C11-neodiamine), 1,6-hexanediamine, 2,5-dimethyl-1,6-hexanediamine, 2,2,4- and 2,4,4-trimethylhexamethylenediamine (TMD), 1,7-heptanediamine, 1,8-octanediamine, 1,9-nonanediamine, 1,10-decanediamine, 1,11-ecanediamine, 1,12-dodecanediamine, 1,2-, 1,3- and 1,4-diaminocyclohexane, bis-(4-aminocyclohexyl)methane ($H_{12}$-MDA), bis-(4-amino-3-methylcyclohexyl)methane, bis-(4-amino-3-ethylcyclohexyl)methane, bis-(4-amino-3,5-dimethylcyclohexyl)methane, bis-(4-amino-3-ethyl-5-methylcyclohexyl)methane (M-MECA), 1-amino-3-aminomethyl-3,5,5-trimethylcyclohexane (=isophoronediamine or IPDA), 2- and 4-methyl-1,3-diaminocyclohexane and mixtures thereof, 1,3- and 1,4-bis-(aminomethyl)cyclohexane, 2,5(2,6)-bis-(aminomethyl)-bicyclo[2.2.1]heptane (NBDA), 3(4),8(9)-bis-(aminomethyl)-tricyclo[5.2.1.0$^{2,6}$]decane, 1,4-diamino-2,2,6-trimethylcyclohexane (TMCDA), 1,8-menthanediamine, 3,9-bis-(3-aminopropyl)-2,4,8,10-tetraoxaspiro[5.5]ecane and 1,3- and 1,4-xylylenediamine, ♦ aliphatic primary diamines containing ether groups, e.g., bis(2-aminoethyl)ether, 3,6-dioxaoctane-1,8-diamine, 4,7-dioxadecane-1,10-diamine, 4,7-dioxadecane-2,9-diamine, 4,9-dioxadodecane-1,12-diamine, 5,8-dioxadodecane-3,10-diamine, 4,7,10-trioxamidecane-1,13-diamine and higher oligomers of these diamines, bis-(3-aminopropyl)polytetrahydrofuranes and other polytetrahydrofuranediamines having molecular weights ranging, e.g., from 350 to 2000, as well as polyoxyalkylenediamines. Typically, the latter are products of the amination of polyoxyalkylene diols and can, for example, be obtained under the name JEFFAMINE® (from Huntsman), under the name Polyetheramin (from BASF) or under the name PC Amine® (from Nitroil). Particularly suitable polyoxyalkylenediamines are JEFFAMINE® D-230, JEFFAMINE® D-400, JEFFAMINE® D-2000, JEFFAMINE® XTJ-511, JEFFAMINE® ED-600, JEFFAMINE® ED-900, JEFFAMINE® ED-2003, JEFFAMINE® XTJ-568, JEFFAMINE® XTJ-569, JEFFAMINE® XTJ-523, JEFFAMINE® XTJ-536, JEFFAMINE® XTJ-542, JEFFAMINE® XTJ-559, JEFFAMINE® EDR-104, JEFFAMINE® EDR-148, JEFFAMINE® EDR-176; Polyetheramin D 230, Polyetheramin D 400, and Polyetheramin D 2000, PC AMINE® DA 250, PC AMINE® DA 400, PC AMINE® DA 650, and PC AMINE® DA 2000;
- ◆ Polyamines having secondary amino groups, e.g., diethylenetriamine (DETA), dipropylenetriamine (DPTA), bishexamethylenetriamine (BHMT), 3-(2-aminoethyl)aminopropylamine, N3-(3-aminopentyl)-1,3-pentanediamine, N5-(3-aminopropyl)-2-methyl-1,5-pentanediamine, N5-(3-amino-1-ethylpropyl)-2-methyl-1,5-pentanediamine, N,N'-dibutylethylenediamine; N,N'-di-tert.butyl-ethylenediamine, N,N'-diethyl-1,6-hexanediamine, 1-(1-methylethylamino)-3-(1-methylethylaminomethyl)-3,5,5-trimethylcyclohexane (JEFFLINK® 754 from Huntsman), N4-cyclohexyl-2-methyl-N2-(2-methylpropyl)-2,4-pentanediamine, N,N'-dialkyl-1,3-xylylenediamine, bis-(4-(N-alkylamino)cyclohexyl)methane, 4,4'-trimethylenedipiperidine, N-alkylated polyetheramines, e.g., the JEFFAMINE® types SD-231, SD-401, SD-404, and SD-2001 (from Huntsman);

amine/polyepoxide addition products,
in particular additions products of the mentioned polyamines with diepoxides with a molar ratio of at least 2/1, in particular with a molar ration from 2/1 to 6/1;
- ◆ Polyamidoamines which are the reaction products of a mono- or polybasic carboxylic acid or the esters or anhydrides thereof, in particular the reaction products of a dimer fatty acid, and an aliphatic, cycloaliphatic or aromatic polyamine used in a stoichiometric excess, in particular a polyalkyleneamine such as, e.g., DETA or triethylenetetramine (TETA), in particular the commercially available polyamidoamines VERSAMID® 100, 125, 140, and 150 (from Cognis), ARADUR® 223, 250, and 848 (from Huntsman), EURETEK®3607, EURETEK® 530 (from Huntsman), BECKOPDX® EH 651, EH 654, EH 655, EH 661, and EH 663 (from Cytec);
- ◆ Polyethyleneimines (PEI).

These are branched polymeric amines derived from the polymerization of ethyleneimine. A suitable polyethyleneimine typically has an average molecular weight in the range from 250 to 25,000 g/mol and contains tertiary, secondary, and primary amino groups. Polyethyleneimines can be obtained, for example, under the trade name LUPASOL® (from BASF), for example, the types LUPASOL® FG, LUPASOL® G20, and LUPASOL® PR 8515;

polymers such as, e.g., polyamides, polysulfides, polyvinylformal (PVF), polyvinylbutyral (PVB), polyurethanes (PUR), polymers containing carboxylic groups, polyamides, butadiene-acrylonitrile copolymers, styrene-acrylonitrile copolymers, butadiene-styrene-copolymers, homo- or copolymers of unsaturated monomers, in particular of the group comprising ethylene, propylene, butylene, isobutylene, isoprene, vinyl acetate, and alkyl(meth)acrylates, in particular chlorosulfonated polyethylenes and polymers containing fluorine, sulfonamide-modified melamines, and cleaned montan waxes;

inorganic and organic fillers, for example, gro or precipitated calcium carbonates optionally coated with fatty acids, in particular stearates, barium sulfate (heavy spar), talcs, quartz flours, quartz sands, dolomites, wollastonites, kaolins, mica (potassium aluminum silicate), molecular sieves, aluminas, aluminum hydroxides, silicic acids, cements, gypsums, flue ashes, carbon blacks, graphite, metal powders such as aluminum, copper, iron, silver, or steel, PVC powders or hollow spheres;

fibers, for example, of plastics or glass;

pigments, for example, titanium dioxide or iron oxides;

accelerators which accelerate the reaction between amino groups and epoxy groups, for example, acids or compounds that can be hydrolyzed to acids, for example, organic carboxylic acids such as acetic acid, benzoic acid, salicylic acid, 2-nitrobenzoic acid, lactic acid, organic sulfonic acids such as methanesulfonic acid, p-toluenesulfonic acid, or 4-dodecylbenzenesulfonic acid, sulfonic acid esters, other organic or inorganic acids such as, for example, phosphoric acid, or mixtures of the aforementioned acids and acid esters; further tertiary amines such as 1,4-diazabicyclo[2.2.2]octane, benzyldimethylamine, α-methylbenzyldimethylamine, triethanolamine, dimethylaminopropylamine, salts of such tertiary amines, quaternary ammonium salts such as, for example, benzyltrimethylammonium chloride, phenols, in particular bisphenols, phenol resins and Mannich bases such as, for example, 2-(dimethylaminomethyl)phenol and 2,4,6-tris-(dimethylaminomethyl)phenol, phosphites such as, for example, di- and triphenylphosphites as well as compounds containing mercapto groups which have already been mentioned above;

rheology modifiers such as, in particular, thickeners, for example, sheet silicates such as bentonites, derivatives of castor oil, hydrogenated castor oil, polyamides, polyurethanes, urea compos, pyrogenic silicic acids, cellulose ethers, and hydrophobically modified polyoxyethylenes;

adhesion promoters, for example, organoalkoxysilanes such as 3-glycidoxypropyltrimethoxysilane, 3-aminopropyltrimethoxysilane, N-(2-aminoethyl)-3-aminopropyltrimethoxysilane, N-(2-aminoethyl)-N'[3-(trimethoxysilyl)propyl]ethylenediamine, 3-ureidopropyltrimethoxysilane, 3-chloropropyltrimethoxysilane, vinyltrimethoxysilane, or the corresponding organosilanes with ethoxy groups or (poly)etheroxy groups instead of methoxy groups;

oxidation, heat, light, and UV radiation stabilizers;

flame retardants, in particular compounds such as alumina ($Al(OH)_3$; also called ATH for "aluminum trihydrate"), magnesium hydroxide ($Mg(OH)_2$; also called MDH for "magnesium dihydrate"), ammonium sulfate (($NH_4)_2$ $SO_4$), boric acid ($B(OH)_3$), zinc borate, melamine borate, and melamine cyanurate; compounds containing phosphorus such as ammonium phosphate (($NH_4)_3$ $PO_4$), ammonium polyphosphate, melamine phosphate, melamine pyrophosphate, triphenyl phosphate, diphenyl cresyl phosphate, tricresyl phosphate, triethyl phosphate, tris-(2-ethylhexyl)phosphate, trioctyl phosphate, mono-, bis-, and tris(isopropylphenyl)phosphate, resorcinolbis(diphenyl phosphate), resorcinol diphosphate oligomer, tetraphenylresorcinol diphosphite, ethylendiamine diphosphate, and bisphenol A bis(diphenyl phosphate); halogen-containing compounds such as chloroalkylphosphates, in particular tris(chloroethyl) phosphate, tris(chloropropyl)phosphate, and tris(dichloroisopropyl)phosphate, polybrominated diphenyl ethers, in particular decabromodiphenyl ether, polybrominated diphenyl oxide, tris[3-bromo-2,2-bis(bromomethyl)propyl]phosphate, tetrabromo bisphenol A, bis(2,3-dibromopropyl ether) of bisphenol A, brominated epoxy resins, ethylene-bis(tetrabromophtalimide), ethylenebis(dibromonorbornanedicarboximide), 1,2-bis-(tribromophenoxy)ethane, tris(2,3-dibromopropyl)isocyanurate, tribromophenol, hexabromocyclododecane, bis(hexachlorocyclopentadieno)cyclooctane, and chloroparaffins; as well as combinations of a halogen-containing compound and antimony trioxide ($Sb_2O_3$), or antimony pentoxide ($Sb_2O_5$);

surfactants such as, for example, wetting agents, flow control agents, deaerating agents or defoaming agents;

biocides, such as, for example, algicides, fungicides or substances that inhibit fungal growth.

The use of fillers is advantageous in that they improve the aging resistance of the adhesive and advantageously influence the mechanical properties.

It is clear and known to a person skilled in the art which components may be added to the resin component and which may be added to the hardener component. Here, in particular, it has to be ensured that the storage stability is not or only slightly impaired by such additional components. Thus, it is clear to a person skilled in the art that a polyamine will react with epoxides in the resin component and can consequently only be a component of the hardener component.

In another aspect the present disclosure pertains to a method for bonding substrates comprising the steps of i) mixing a two-component epoxy resin composition as defined above;

ii) applying the composition to the surface of a substrate S1, in particular a metal;

iii) contacting the applied epoxy resin composition with the surface of another substrate S2, in particular a metal; and iv) curing the epoxy resin composition at a temperature of or below 100° C., preferably from 10 to 40° C.

In its application as an adhesive, the composition is applied to a substrate S1 and/or a substrate S2. The adhesive may therefore be applied to one substrate or the other or to both substrates. Thereafter the parts to be bonded are joined, whereupon the adhesive cures. Here it should be ensured that the joining of the parts takes place within the time known as the open time, in order to ensure that both adherents are reliably bonded to one another.

The adhesive or sealant is preferably applied evenly.

In both applications the substrate S1 may be the same as or different from substrate S2.

Examples of suitable substrates S1 or S2 are inorganic substrates such as glass, glass ceramic, concrete, mortar, brick, tile, plaster, and natural stones such as granite or marble; in particular metals or alloys such as aluminum, steel, nonferrous metals, galvanized metals; organic substrates such as wood, plastics such as PVC, polycarbonates, PMMA, polyesters, epoxy resins, glass fiber reinforced plastics (GFRP), carbon fiber reinforced plastics (CFRP); coated substrates such as powder-coated metals or alloys; and also paints and finishes, more particularly automotive topcoats.

It has been shown that the two-component epoxy resin compositions adhere well especially to electrogalvanized steel and result in an increased impact strength.

It is important to realize that the impact strength modifiers according to the present disclosure are effective not only when cured at elevated temperatures, but that they also result in an increase of the impact strength when cured at room temperature. This is in no way obvious since, on the one hand, the development of impact strength is often explained by a phase separation during curing and, on the other hand, this phase separation is temperature-dependent.

The described impact strength modifiers allow to formulate epoxy resin compositions which typically have fracture energies, measured according to ISO 11343, of greater than 8.0 J at 23° C. and greater than 5.5 J at 0° C. Compositions can be typically formulated which have fracture energies from 9.5 J to 12 J at 23° C. and from 6 to 9 J at 0° C.

Moreover, resistances to fracture (impact peel), measured according to ISO 11343, of greater than 20 N/mm at 23° C. and greater than 15 N/m at 0° C. can be realized. Compositions can be typically formulated which have resistances to fracture of from 26 to 30 N at 23° C. and from 18 to 25 N at 0° C.

If necessary, the substrates can be pretreated before the application of the adhesive or sealant. Such pretreatments comprise, in particular, physical and/or chemical cleaning methods, for example grinding, sandblasting, brushing or the like or treatment with cleaning agents or solvents or the application of an adhesion promoter, an adhesion-promoting solution or a primer.

After the substrates S1 and S2 have been bonded or sealed by means of a composition according to the present disclosure, a bonded article is obtained. An article of this kind may be a built structure, more particularly a built structure in construction or civil engineering, or a means of transport. Preferably, the article is a means of transport, for example, a water or land vehicle, in particular an automobile, a bus, a truck, a train or a ship, or a component for installation thereof. Especially preferred the bonded article is a means of transport, in particular an automobile, or a component for installation of a means of transport, in particular of an automobile.

If the composition is used as adhesive for elastic bonds in vehicle manufacturing, it has preferably a pasty consistency with structurally viscous properties. Such an adhesive is applied to the substrate by means of a suitable device, preferably in the form of a bead having a substantially ro or triangular cross-sectional area. Suitable methods for applying the adhesive are, for example, the application from commercially available cartridges which can be operated manually or by compressed air, or from a barrel or hobbock by means of a feed pump or an extruder, optionally by means of an application robot. An adhesive with good application properties has a high stability under load and a low stringiness. That means that it remains in the applied form after application, that is, it does not flow and does not draw a thread or only a very short thread, thus avoiding soiling of the substrate.

In vehicle manufacturing, bonds are made by, e.g., bonding parts such as plastic covers, trims, flanges, bumpers, driver's cabs or other attachments to the painted body of a means of transport or the bonding of panes to the body. As vehicles, automobiles, trucks, buses, rail vehicles and ships are mentioned.

In a preferred embodiment the two-component epoxy resin composition defined above is used as two-component repair adhesive in vehicle manufacturing.

In another preferred embodiment the impact strength modifier of the present disclosure is used in the preparation of an epoxy resin composition.

EXAMPLES

A few examples are given below which illustrate the present disclosure further but do not limit the scope of the present disclosure in any way and merely illustrate some of the possible embodiments. Table 2 illustrates the experimental evaluation of the epoxy resin compositions according to the present disclosure in comparison with the state of the art.

Methods for Preparing Compositions

The starting materials listed in Table 1 were used in the preparation.

TABLE 1

Starting materials used.

| | |
|---|---|
| D.E.R. ™ 330 (bisphenol A diglycidyl ether = "DER330") | Dow Chemical Company |
| D.E.R. ™ 671 (="DER 671") ("type 1" solid epoxy resin) (EP equivalent weight 475-550 g/eq) | Dow Chemical Company |
| POLYPOX R7 (tert-butylphenyl glycidyl ether) = "Polypox") | UPPC |
| Poly-THF 2000 (difunctional polybutylene glycol) (OH equivalent weight = approx. 1000 g/OH equivalent) | BASF |
| LIQUIFLEX H (hydroxyl-terminated polybutadiene) (OH equivalent weight = approx. 1230 g/OH equivalent) | Krahn |
| Isophorone diisocyanate (="IPDI") | Evonik |
| JEFFAMINE ® D-2000 | Huntsman |
| JEFFAMINE ® D-400 | Huntsman |
| DYNACOLL ® 7490 (polyester) | Evonik |
| DYNACOLL ® 7250 (polyester, molecular weight 5500 g/mol, Tg = −50° C., hydroxyl value 18-24 mgKOH/g)) | Evonik |
| HYPRO ™1300X16 Polymer ATBN (="ATBN') | Emerald Performance Material LLC |
| VERSAMID ® 140 (polyamide, reaction product of dimerized fatty acid/polyamine) | Cognis |

Amino Group Terminated Impact Strength Modifier SM1

200 g of Poly-THF 2000, 48.18 g of IPDI, and 0.03 g of dibutyltin dilaurate are weighed into a vessel and heated under vacuum to 80° C. After approx. 120 minutes an NCO content of 3.5% is determined. Subsequently, the formed prepolymer P-1 is allowed to cool under vacuum for 60 minutes (to 25° C.). 234.60 g of JEFFAMINE® D-2000 is added, and 70 g of prepolymer P-1 is slowly added with stirring under nitrogen. The reaction is allowed to proceed for 60 minutes to produce the amino group terminated impact strength modifier SM1. The ratio of NCO groups to $NH_2$ groups is 0.248.

Amino Group Terminated Impact Strength Modifier SM2.

80 g of Poly-THF 2000, 35.18 g of IPDI, and 0.03 g of dibutyltin dilaurate as well as 80.0 g of LIQUIFLEX H are weighed into a vessel and heated under vacuum to 80° C. After 120 minutes an NCO content of 3.5% is determined. The contents are stirred under vacuum at 80° C. for 90 minutes and subsequently cooled down to 50° C. in 60 minutes (=prepolymer P-2). 233.20 g of JEFFAMINE® D-2000 is added to a second reaction vessel and 35 g of the prepolymer P-2, which in the meantime has cooled down to 35° C. in the first reaction vessel, is slowly added with stirring. The reaction is allowed to proceed for 60 minutes to produce the amino group terminated impact strength modifier SM2. The ratio of NCO groups to $NH_2$ groups is 0.125.

Amino Group Terminated Impact Strength Modifier SM3.

50 g of Poly-THF 2000, 33.93 g of IPDI, and 0.02 g of dibutyltin dilaurate are weighed into a vessel and heated under vacuum to 80° C. After approx. 60 minutes an NCO content of 4.11% is determined. Thereafter 1 g of trimethylolpropane is added and allowed to react under vacuum for another 75 minutes. At that time, an NCO content of 2.60% is measured. In the next step, 8.70 g of hydroxyethyl acrylate (containing 0.1% of hydroquinone) are weighed out and added to the above reaction mixture at 70° C. After stirring for 3 hours at this temperature under vacuum, the so-formed prepolymer P-3 has a measured NCO content of 0.55%. Finally, 200.30 g of JEFFAMINE® D-2000 is added to a second reaction vessel, and 40 g of the prepolymer P-3, which in the meantime has cooled down to 35° C. in the first reaction vessel, is slowly (within 60 minutes) added with stirring under nitrogen. The reaction is allowed to proceed for 60 minutes to produce the amino group terminated impact strength modifier SM3.

Amino Group Terminated Impact Strength Modifier SM4

150 g of Poly-THF 2000, 33.93 g of IPDI, and 0.02 g of dibutyltin dilaurate are weighed into a vessel and heated under vacuum to 80° C. After approx. 60 minutes an NCO content of 4.11% is measured. Then, 1 g of trimethylolpropane is added, the reaction is allowed to proceed for another 75 minutes under vacuum, and a NCO content of 2.60% is measured. In the next step, 8.70 g of hydroxyethyl acrylate (containing 0.1% of hydroquinone) are weighed out and added to the above reaction mixture at 70° C. After stirring for 3 hours at this temperature under vacuum, the so-formed prepolymer P-4 has a measured NCO content of 0.55%. Finally, 100.1 g of JEFFAMINE® D400 is added to a second reaction vessel, and 100 g of the prepolymer P-4, which in the meantime has cooled down to 25° C. in the first reaction vessel, is slowly added (within 60 minutes, with stirring). The reaction is allowed to proceed for 60 minutes to produce the amino group terminated impact strength modifier SM4.

Amino Group Terminated Impact Strength Modifier SM5

80.00 g of Poly-THF 2000, 30.53 g of IPDI, and 0.02 g of dibutyltin dilaurate as well as 80 g of DYNACOLL® 7250 are weighed into a vessel and heated under vacuum to 80° C. The NCO content is determined after approximately 120 minutes (3.00%). The thus-formed polymer P-5 is allowed to cool down to 20° C. in 60 minutes. Finally, 201.20 g of JEFFAMINE® D-2000 is added to a second reaction vessel, and 35 g of the prepolymer P-5, which in the meantime has cooled down to 25° C. in the first reaction vessel, is slowly added (within 60 minutes, with stirring). The reaction is allowed to proceed for 60 minutes to produce the amino group terminated impact strength modifier SM5. The ratio of NCO groups to $NH_2$ groups is 0.063.

Amino Group Terminated Impact Strength Modifier SM6

210.0 g of DYNACOLL® 7490, 27.81 g of IPDI, and 0.03 g of dibutyltin dilaurate are weighed into a vessel and heated under vacuum to 80° C. The NCO content is determined after 120 minutes (2.60%) (=prepolymer P-6). Finally, 146.20 g of JEFFAMINE® D-2000 is added to a second reaction vessel, and 40 g of the prepolymer P-6, which in the meantime has cooled down to 25° C. in the first reaction vessel, is slowly added (within 60 minutes, with stirring). The reaction is allowed to proceed for 60 minutes to produce the amino group terminated impact strength modifier SM6. The ratio of NCO groups to $NH_2$ groups is 0.085.

Amino Group Terminated Impact Strength Modifier SM7

220 g of ACCLAIM® 4200N, 27.4 g of IPDI and 0.01 g dibutyltin dilaurate are weighed into a vessel and heated under vacuum. After approx. 2 hours an NCO content of 2.25% is measured. The thus-formed polymer P-7 (=prepolymer P-7) is cooled down to 20° C. Finally, 69.8 g of JEFFAMINE® D-400 tert.butyl acrylate, the reaction product of JEFFAMINE® D-400 and tert.butyl acrylate, ratio 1:0.8) is added to a second vessel and 40 g of the prepolymer P-7 is slowly added (within 60 minutes). The reaction is allowed to proceed for 60 minutes to produce the amino group terminated impact strength modifier SM7.

Preparation of the Impact Strength Modifier C3-1

150 g of Poly-THF® 2000 (OH value 57 mg/g KOH, BASF) and 150 g LIQUIFLEX H(OH value 46 mg/g KOH, Krahn) were dried under vacuum at 105° C. for 30 minutes. After lowering the temperature to 90° C., 64.0 g of isophorone diisocyanate and 0.13 g of dibutyltin dilaurate were added. The reaction was continued under vacuum at 90° C. until a constant NCO content of 3.30% was obtained after 2.5 hours (calculated NCO content: 3.38%). Subsequently, 103.0 g of the blocking agent CARDOLITE® NC-700 (Cardanol, Cardolite) was added. Stirring was continued under vacuum at 105° C. until the NCO content had decreased below 0.1% after 3.5 hours. The thus-formed blocked polyurethane impact strength modifier was designated as C3-1.

The two-component epoxy resin compositions listed in Table 2 were prepared. In Table 2, the numbers stated for components represent parts by weight. The respective resin or hardener components were prepared by adding the respective liquid ingredients to a mixing vessel at 40° C. and subsequently mixing in the solid ingredients at 23° C. and by applying a vacuum. The formed resin or hardener components which had a pasty consistency were filled in tin cans and sealed.

Automotive. Comparative example Ref. 2 illustrates the prior art example "Adhesive example 1" made of components "A1" and "B1" described in WO 2009/025991. Comparative example Ref. 3 corresponds to the prior art described in an example of WO 2009/025991, according to which component "A1" and a filled hardener component "B1" are mixed in a weight ratio of 2:1. Comparative example Ref. 4 corresponds to a combination of the resin component used for examples 1 to 6 according to the disclosure and a filled hardener component "B1" of the prior art described in WO 2009/025991. Comparative example Ref. 5 corresponds to a 2:1 weight ratio combination of the resin component used for examples 1 to 6 according to the disclosure and a filled hardener component adjusted to hardener component "B1" of WO 2009/025991, the hardener component containing a proportion of 30% by weight VERSAMID® which has been disclosed as the upper limit according to claim 1 of WO 2009/025991 for the polyamide (VERSAMID®). Comparative example Ref. 6 corresponds to a 2:1 weight ratio combination of the resin component used for examples 1 to 6 according to

TABLE 2

Two-component compositions (data in parts by weight). First component:second component mixing ratio = 2:1 (w:w).

|  | Ref. 2 | Ref. 3 | Ref. 4 | Ref. 5 | Ref. 6 | 1 | 2 | 3 | 4 | 5 | 6 | 7 |
|---|---|---|---|---|---|---|---|---|---|---|---|---|
| 1st Component | | | | | | | | | | | | |
| DER330 | 67.0 | 67.0 | 56.0 | 56.0 | 56.0 | 56.0 | 56.0 | 56.0 | 56.0 | 56.0 | 56.0 | 56.0 |
| DER671 | | | 9.0 | 9.0 | 9.0 | 9.0 | 9.0 | 9.0 | 9.0 | 9.0 | 9.0 | 9.0 |
| C3-1 | | | 17.0 | 17.0 | 17.0 | 17.0 | 17.0 | 17.0 | 17.0 | 17.0 | 17.0 | 17.0 |
| Toughener B [1] | 21.0 | 21.0 | | | | | | | | | | |
| POLUPOX | | | 5.0 | 5.0 | 5.0 | 5.0 | 5.0 | 5.0 | 5.0 | 5.0 | 5.0 | 5.0 |
| DYNASILAN A187 [2] | 3.0 | 3.0 | | | | | | | | | | |
| Epoxysilane | | | 0.9 | 0.9 | 0.9 | 0.9 | 0.9 | 0.9 | 0.9 | 0.9 | 0.9 | 0.9 |
| CARDOLITE® NC-700 | 0.5 | 0.5 | | | | | | | | | | |
| Surfactant | | | 0.1 | 0.1 | 0.1 | 0.1 | 0.1 | 0.1 | 0.1 | 0.1 | 0.1 | 0.1 |
| Fumed Silica | 4.5 | 4.5 | 3.0 | 3.0 | 3.0 | 3.0 | 3.0 | 3.0 | 3.0 | 3.0 | 3.0 | 3.0 |
| Filler mixture | | | 6.0 | 6.0 | 6.0 | 6.0 | 6.0 | 6.0 | 6.0 | 6.0 | 6.0 | 6.0 |
| Talc | 3.6 | 3.6 | 3.0 | 3.0 | 3.0 | 3.0 | 3.0 | 3.0 | 3.0 | 3.0 | 3.0 | 3.0 |
| 2nd component | | | | | | | | | | | | |
| ATBN | 17.0 | 17.0 | 17.0 | 11.8 | 19.0 | 23.5 | 23.5 | 23.5 | 23.5 | 23.5 | 23.5 | 23.5 |
| 4,7,10-trioxatridecane-1,13-diamine | 10.0 | 10.0 | 10.0 | 10.4 | 10.0 | 15.0 | 15.0 | 15.0 | 15.0 | 15.0 | 15.0 | 15.0 |
| LUPASOL® P [3] | 14.0 | 14.0 | 14.0 | 8.6 | 14.0 | | | | | | | |
| LUPASOL® WF [4] | | | | | | 10.0 | 10.0 | 10.0 | 10.0 | 10.0 | 10.0 | 10.0 |
| JEFFAMINE® D-400 | 22.3 | 22.3 | 22.3 | 15.7 | 24.3 | 5.0 | 5.0 | 5.0 | 5.0 | 5.0 | 5.0 | 5.0 |
| VERSAMID® 140 | 14.0 | 14.0 | 14.0 | 30.0 | 10.0 | 7.0 | 7.0 | 7.0 | 7.0 | 7.0 | 7.0 | 7.0 |
| Catalyst [5] | 5.0 | 5.0 | 5.0 | 5.2 | 5.0 | 1.5 | 1.5 | 1.5 | 1.5 | 1.5 | 1.5 | 1.5 |
| SM1 | | | | | | 15.0 | | | | | | |
| SM2 | | | | | | | 15.0 | | | | | |
| SM3 | | | | | | | | 15.0 | | | | |
| SM4 | | | | | | | | | 15.0 | | | |
| SM5 | | | | | | | | | | 15.0 | | |
| SM6 | | | | | | | | | | | 15.0 | |
| SM7 | | | | | | | | | | | | 15.0 |
| Pyrogenic silicic acid | | 5.0 | 5.0 | 5.0 | 5.0 | 5.0 | 5.0 | 5.0 | 5.0 | 5.0 | 5.0 | 5.0 |
| Filler mixture | | 12.7 | 12.7 | 13.3 | 13.3 | 18.0 | 18.0 | 18.0 | 18.0 | 18.0 | 18.0 | 18.0 |

[1] Toughener B = prepared according to paragraph [0075] in US 2005/0070634 A1;
[2] DYNASILAN A187 (Epoxysilan, Evonik);
[3] LUPASOL® P (BASF) = polyethyleneimine, Mw = 750,000 g/mol, 50% in water;
[4] LUPASOL® WF (BASF) = polyethyleneimine, Mw = 25,000 g/mol);
[5] catalyst = 2,4,6-tris(dimethylaminomethyl)phenol Comparative example Ref. 1 illustrates the adhesive BETAMATE™ 2096 commercially available from Dow the disclosure and a filled hardener component adjusted to hardener component "B1" of WO 2009/025991, the hardener component containing a proportion of 10% by weight VERSAMID® which has been disclosed as the lower limit according to claim 1 of WO 2009/025991 for the polyamide (VERSAMID®).

Test Methods:

For testing, the respective resin and hardener components of Table 2 were mixed largely homogenously in a weight ratio of 2:1 using a stirrer and directly applied to the substrate surfaces used for preparing the test pieces.

Tensile Shear Strength (TSS) (DIN EN 1465)

The test pieces were prepared from the example compositions described and with electrogalvanized DC04 steel (eloZn) having dimensions 100×25×1.5 mm. Prior to bonding, the substrate was cleaned with acetone. The adhesion surface area was 25×10 mm with a layer thickness of 0.3 mm. After curing for 7 days at 23° C., the tensile shear strength ($TSS_{7d,\ RT}$) was measured at a pull rate of 10 mm/min. The results are summarized in Table 3.

Impact/Peel Work (ISO 11343)

The test pieces were prepared from the example compositions described and with electrogalvanized DC04 steel (eloZn) having dimensions 90×20×0.8 mm, where the adhesion surface area was 25×10 mm with a layer thickness of 0.3 mm. They were cured for 7 days at 23° C. The impact/peel work was measured respectively at 23° C. ($FE_{RT}$) and at 0° C. ($FE_{0°\ C.}$). The impact velocity was 2 m/s. The area under the measurement curve (from 25% to 90%, according to ISO 11343) is given as the fracture energy (FE) ($FE_{RT}$ or $FE_{0°\ C.}$), respectively, in joules. The impact peel strength values (Impact Peel) were measured according to ISO 11343 at 23° C. ($IP_{RT}$) and at 0° C. ($IP_{0°\ C.}$).

The results are summarized in table 3.

Results

TABLE 3

Mechanical properties of the cured compositions.

| | Ref. 1 | Ref. 2 | Ref. 3 | Ref. 4 | Ref. 5 | Ref. 6 | 1 | 2 | 3 | 4 | 5 | 6 | 7 |
|---|---|---|---|---|---|---|---|---|---|---|---|---|---|
| $ZSF_{7d,\ RT}$ [MPa] | 24.0 | 24.8 | 22.5 | 25.4 | 26.0 | 24.8 | 13.0 | 15.4 | 16.1 | 17.8 | 15.5 | 17.1 | 11.7 |
| $FE_{RT}$ [J] | 0.9 | 6.5 | 0.7 | 0.5 | 0.5 | 3.6 | 10.9 | 9.9 | 8.6 | 10.2 | 8.7 | 9.9 | 5.84 |
| $IP_{RT}$ [N/mm] | 3.0 | 16.5 | 2.5 | 2.0 | 2.0 | 11.0 | 28.0 | 26.0 | 24.0 | 27.5 | 23.0 | 26.0 | 15 |
| $FE_{0°\ C.}$ [J] | 0.2 | 2.9 | 1.2 | 0.5 | 0.4 | 1.3 | 8.1 | 5.7 | 5.9 | 5.7 | 5.6 | 5.9 | 6.14 |
| $IP_{0°\ C.}$ [N/mm] | 0.5 | 8.5 | 5.0 | 2.0 | 1.5 | 6.5 | 24.0 | 17.5 | 18.5 | 19.0 | 17.5 | 18.0 | 18 |

Table 3 shows that comparative examples Ref. 1 to Ref. 6 have significantly lower impact strengths (fracture energies & impact peel strengths) on electrogalvanized steel compared to compositions 1 to 6 according to the disclosure. Rather, compositions 1 to 6 according to the disclosure have impact peel strength values that are 10 times superior over those of the comparative table 1 which correspond to compositions of prior art. Although the slight tensile shear strengths are slightly reduced, they still have high and acceptable levels. The comparison of comparative examples Ref. 3, Ref. 4 and Ref. 5, respectively, shows that the increased impact strength is not caused by the resin components. It mainly results from the amino group terminated impact strength modifier in the hardener component.

Even in the compositions according to the disclosure containing fillers, the decrease of the fracture energy and the impact peel strengths (comparison between Ref. 2 and Ref. 3) caused by the use of fillers can be more than compensated.

The compositions according to the disclosure show a distinct increase of the fracture energies due to their increased flexibility. Thus, the adhesive joints do not become brittle even under higher impact loads, but they have flexibility sufficient to completely maintain their bond integrity. However, the flexibility of the comparative examples is considerably lower, so that the adhesive joint will break already at lower stresses.

Hence, the impact strength modifiers according to the disclosure and the epoxy resin compounds containing the same are in particular suitable for vehicle manufacturing where adhesive joints are required to maintain their integrity even under high mechanical loads, e.g., in the event of an accident.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for preparing an amino group terminated polyurethane comprising reacting a polyurethane prepolymer having isocyanate groups, a primary diamine, and optionally at least one Michael acceptor,
   wherein the polyurethane prepolymer having isocyanate groups is prepared from at least one polyisocyanate and at least one polyester or polyether polyol having at least two hydroxyl groups,
   provided that when the primary diamine has a molecular weight of less than 600 g/mol, the Michael acceptor is involved in the method, and,
   in comparison to the polyurethane prepolymer having isocyanate groups, the primary diamine is used such that the ratio of isocyanate groups to amino groups is less than 0.5.

2. The method according to claim 1, wherein the diamine is selected from the group consisting of aliphatic diamines containing ether groups, amino group terminated polybutadienes and butadiene/acrylonitrile copolymers or a mixture thereof.

3. The method according to claim 1, wherein the polyurethane prepolymer having isocyanate groups and/or the primary diamine and/or the polyurethane prepolymer having isocyanate groups reacted with the diamine is reacted with the Michael acceptor.

4. The method according to claim 1, wherein the amino group terminated polyurethane is terminated with secondary amino groups and results from reacting an amino group terminated impact strength modifier with primary amino groups and the Michael acceptor.

5. The method according to claim 1, wherein the Michael acceptor has the formula (I) or (Ia)

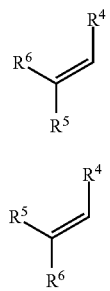

(I)

(Ia)

wherein
R$^4$ is a hydrogen atom or a moiety selected from the group consisting of R$^7$, —COOR$^7$, and —CN,
R$^5$ is a moiety selected from the group consisting of COOR$^7$, CONH$_2$, CONHR$^7$, CONR$^7_2$, CN, NO$_2$, PO(OR$^7$)$_2$, SO$_2$R$^7$, and SO$_2$OR$^7$;
and R$^6$ is a hydrogen atom or a moiety selected from the group consisting of —CH$_3$, —R$^7$, —COOR$^7$, and —CH$_2$COOR$^7$,
wherein R$^7$ is a univalent hydrocarbon moiety having from 1 to 20 carbon atoms.

6. The method according to claim 1, wherein the amino group terminated polyurethane has the formula (II)

and R$^6$ is a hydrogen atom or a moiety selected from the group consisting of —R$^7$, —COOR$^7$, —CH$_2$COOR$^7$, and —CN,
wherein R$^7$ is a univalent hydrocarbon moiety having from 1 to 20 carbon atoms;
Y$^4$ is an alkylene group having from 1 to 6 carbon atoms or provided that p and p'=0 is nothing; and
Y$^5$ is a divalent moiety of the formula (IV) or (IV');

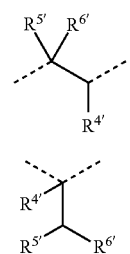

(IV)

(IV')

wherein
R$^{4'}$ is a hydrogen atom or a moiety selected from the group consisting of R$^7$, —COOR$^7$, and —CN,
R$^{5'}$ is a moiety selected from the group consisting of COOR$^7$, CONH$_2$, CONHR$^7$, CONR$^7_2$, CN, NO$_2$, PO(OR$^7$)$_2$, SO$_2$R$^7$, and SO$_2$OR$^7$, and
R$^{6'}$ is a hydrogen atom or a moiety selected from the group consisting of —R$^7$, —COOR$^7$, —CH$_2$COOR$^7$, and —CN,
wherein R$^7$ is a univalent hydrocarbon moiety having from 1 to 20 carbon atoms;

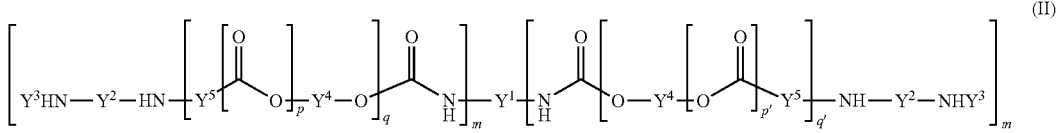

(II)

wherein Y$^1$ is a linear or branched polyurethane prepolymer terminated with m+m' isocyanate groups, after removal of all terminal isocyanate groups;
Y$^2$ is a divalent group of a polyoxyalkylene having C$_2$-C$_6$alkylene groups, a polybutadiene, a butadiene/acrylonitrile copolymer or a synthetic rubber;
Y$^3$ independently of one another is H or an alkyl group having from 1 to 10 carbon atoms or a moiety of the formula (III),

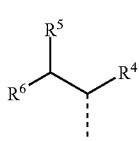

(III)

wherein
R$^4$ is a hydrogen atom or a moiety selected from the group consisting of R$^7$, —COOR$^7$, and —CN,
R$^5$ is a moiety selected from the group consisting of COOR$^7$, CONH$_2$, CONHR$^7$, CONR$^7_2$, CN, NO$_2$, PO(OR$^7$)$_2$, SO$_2$R$^7$, and SO$_2$OR$^7$;

p and p' are each 0 or 1;
q and q' are each 0 or 1;
m and m' are each values of from 0 to 7, provided that m+m' are a value of from 1 to 8.

7. The method according to claim 1, wherein the amino group terminated polyurethane has the formula (V)

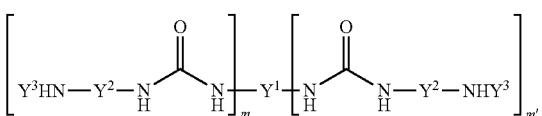

(V)

wherein Y$^1$ is a linear or branched polyurethane prepolymer terminated with m+m' isocyanate groups, after removal of all terminal isocyanate groups;
Y$^2$ is a divalent group of a polyalkoxylene having C$_2$-C$_6$alkylene groups, a polybutadiene, a butadiene/acrylonitrile copolymer or a synthetic rubber; and
Y$^3$ independently of one another is H or an alkyl group having from 1 to 10 carbon atoms or a moiety of the formula (VI),

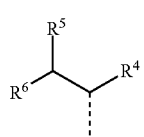

(VI)

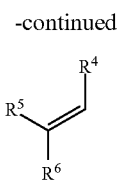

(Ia)

wherein $R^4$ is a hydrogen atom or a moiety selected from the group consisting of $R^7$, —$COOR^7$, and —CN, $R^5$ is a moiety selected from the group consisting of $COOR^7$, $CONH_2$, $CONHR^7$, $CONR^7_2$, CN, $NO_2$, $PO(OR^7)_2$, $SO_2R^7$ and $SO_2OR^7$, and $R^6$ is a hydrogen atom or a moiety selected from the group consisting of —$R^7$, —$COOR^7$, —$CH_2COOR^7$, and —CN, wherein $R^7$ is a univalent hydrocarbon moiety having from 1 to 20 carbon atoms;

m and m' are each values of from 0 to 7, provided that m+m' are a value of from 1 to 8.

8. An amino group terminated impact strength modifier prepared by reacting a polyurethane prepolymer having isocyanate groups, a primary diamine, and optionally at least one Michael acceptor, wherein the polyurethane prepolymer having isocyanate groups is prepared from at least one polyisocyanate and at least one polyester or polyether polyol having at least two hydroxyl groups, provided that when the primary diamine has a molecular weight of less than 600 g/mol, the Michael acceptor is involved in the preparation of the amino group terminated impact strength modifier, and, in comparison to the polyurethane prepolymer having isocyanate groups, the primary diamine is used such that the ratio of isocyanate groups to amino groups is less than 0.5.

9. The impact strength modifier according to claim 8, wherein (i) the diamine is selected from the group consisting of aliphatic diamines containing ether groups, amino group terminated polybutadienes and butadiene/acrylonitrile copolymers or a mixture thereof, (ii) the polyurethane prepolymer having isocyanate groups and/or the primary diamine and/or the polyurethane prepolymer having isocyanate groups reacted with the diamine is reacted with the Michael acceptor, (iii) the amino group terminated impact strength modifier is terminated with secondary amino groups and results from reacting an amino group terminated impact strength modifier with primary amino groups and the Michael acceptor, or (iv) the Michael acceptor has the formula (I) or (Ia)

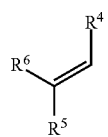

(I)

wherein $R^4$ is a hydrogen atom or a moiety selected from the group consisting of $R^7$, —$COOR^7$, and —CN, $R^5$ is a moiety selected from the group consisting of $COOR^7$, $CONH_2$, $CONHR^7$, $CONR^7_2$, CN, $NO_2$, $PO(OR^7)_2$, $SO_2R^7$, and $SO_2OR^7$;

and $R^6$ is a hydrogen atom or a moiety selected from the group consisting of —$CH_3$, —$R^7$, —$COOR^7$, and —$CH_2COOR^7$, wherein $R^7$ is a univalent hydrocarbon moiety having from 1 to 20 carbon atoms.

10. A two-component epoxy resin composition comprising one component K1 comprising at least one epoxy resin A that contains on average more than one epoxy group per molecule;

one component K2 comprising a hardener B for epoxy resins; and at least one amino group terminated polyurethane C prepared by the method of claim 1 in component K2.

11. The two-component epoxy resin composition according to claim 10, wherein the hardener B is a hardener selected from the group consisting of poly(ethyleneimines), polyamidoamines, amino group terminated butadiene/acrylonitrile copolymers and polyamines.

12. The two-component epoxy resin composition according to claim 10, wherein the composition further comprises at least one additional impact strength modifier D.

13. A method for bonding substrates comprising the steps of i) mixing a two-component epoxy resin composition according to claim 10;

ii) applying the composition to a surface of a substrate S1;

iii) contacting the applied epoxy resin composition with a surface of another substrate S2; and iv) curing the epoxy resin composition at a temperature of or below 100° C.

14. A two-component repair adhesive in vehicle manufacturing comprising a two-component epoxy resin composition according to claim 10.

15. An epoxy resin composition comprising an amino group terminated impact strength modifier according to claim 8.

16. The method according to claim 2, wherein the aliphatic diamines containing ether groups comprise polyoxyethylenediamines, polyoxypropylenediamines, and polyoxybutylenediamines.

17. The method according to claim 6, wherein m and m' are each values of 0 or 1 or 2.

18. The impact strength modifier according to claim 8, wherein the amino group terminated impact strength modifier has the formula (II)

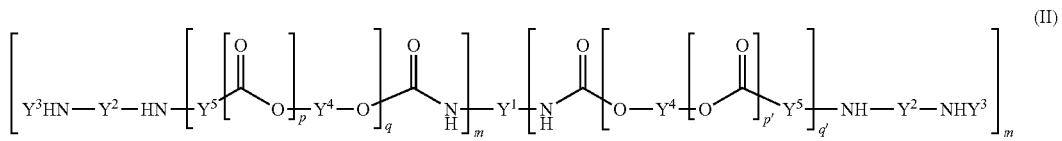

wherein Y¹ is a linear or branched polyurethane prepolymer terminated with m+m' isocyanate groups, after removal of all terminal isocyanate groups;
Y² is a divalent group of a polyoxyalkylene having $C_2$-$C_6$alkylene groups, a polybutadiene, a butadiene/acrylonitrile copolymer or a synthetic rubber;
Y³ independently of one another is H or an alkyl group having from 1 to 10 carbon atoms or a moiety of the formula (III),

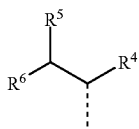

wherein
R⁴ is a hydrogen atom or a moiety selected from the group consisting of R⁷, —COOR⁷, and —CN,
R⁵ is a moiety selected from the group consisting of COOR⁷, CONH₂, CONHR⁷, CONR⁷₂, CN, NO₂, PO(OR⁷)₂, SO₂R⁷, and SO₂OR⁷;
and R⁶ is a hydrogen atom or a moiety selected from the group consisting of —R⁷, —COOR⁷, —CH₂COOR⁷, and —CN,
wherein R⁷ is a univalent hydrocarbon moiety having from 1 to 20 carbon atoms;
Y⁴ is an alkylene group having from 1 to 6 carbon atoms or provided that p and p'=0 is nothing; and
Y⁵ is a divalent moiety of the formula (IV) or (IV');

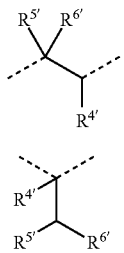

wherein
R⁴' is a hydrogen atom or a moiety selected from the group consisting of R⁷, —COOR⁷, and —CN,
R⁵' is a moiety selected from the group consisting of COOR⁷, CONH₂, CONHR⁷, CONR⁷₂, CN, NO₂, PO(OR⁷)₂, SO₂R⁷, and SO₂OR⁷, and
R⁶' is a hydrogen atom or a moiety selected from the group consisting of —R⁷, —COOR⁷, —CH₂COOR⁷, and —CN,
wherein R⁷ is a univalent hydrocarbon moiety having from 1 to 20 carbon atoms;
p and p' are each 0 or 1;
q and q' are each 0 or 1;

m and m' are each values of from 0 to 7, provided that m+m' are a value of from 1 to 8.

19. The impact strength modifier according to claim 8, wherein the amino group terminated impact strength modifier has the formula (V)

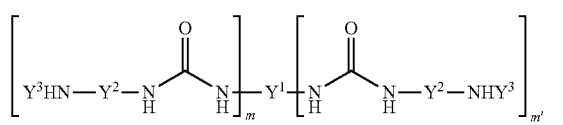

wherein Y¹ is a linear or branched polyurethane prepolymer terminated with m+m' isocyanate groups, after removal of all terminal isocyanate groups;
Y² is a divalent group of a polyalkoxylene having $C_2$-$C_6$alkylene groups, a polybutadiene, a butadiene/acrylonitrile copolymer or a synthetic rubber; and
Y³ independently of one another is H or an alkyl group having from 1 to 10 carbon atoms or a moiety of the formula (VI),

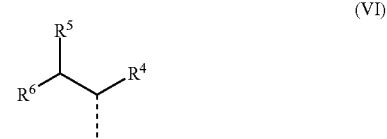

wherein
R⁴ is a hydrogen atom or a moiety selected from the group consisting of R⁷, —COOR⁷, and —CN,
R⁵ is a moiety selected from the group consisting of COOR⁷, CONH₂, CONHR⁷, CONR⁷₂, CN, NO₂, PO(OR⁷)₂, SO₂R⁷ and SO₂OR⁷, and
R⁶ is a hydrogen atom or a moiety selected from the group consisting of —R⁷, —COOR⁷, —CH₂COOR⁷, and —CN,
wherein R⁷ is a univalent hydrocarbon moiety having from 1 to 20 carbon atoms;
m and m' are each values of from 0 to 7, provided that m+m' are a value of from 1 to 8.

20. The method according to claim 13, wherein the substrate S1 and/or the substrate S2 comprises a metal.

21. The impact strength modifier according to claim 8, wherein the primary diamine is polyoxyalkylene diamine.

22. The impact strength modifier according to claim 8, wherein the Michael acceptor is involved in the preparation of the amino group terminated impact strength modifier, and wherein the Michael acceptor reacts through a Michael addition mechanism.

23. The impact strength modifier according to claim 8, wherein when the primary diamine has a molecular weight of less than 600 g/mol, the Michael acceptor is involved in the preparation of the amino group terminated impact strength modifier through a Michael addition mechanism.

24. The impact strength modifier according to claim 8, wherein, in comparison to the polyurethane prepolymer having isocyanate groups, the primary diamine is used such that the ration of isocyanate groups to amino groups is less than 0.4.

* * * * *